US006736235B2

United States Patent
Yoshida et al.

(10) Patent No.: US 6,736,235 B2
(45) Date of Patent: May 18, 2004

(54) POWERED STEERING DEVICE AND BALL SCREW MECHANISM THEREFOR

(75) Inventors: Isamu Yoshida, Iwata (JP); Kiyotake Shibata, Iwata (JP); Yoshinori Ikeda, Iwata (JP)

(73) Assignee: NTN Corporation, Osaka (JP)

( * ) Notice: Subject to any disclaimer, the term of this patent is extended or adjusted under 35 U.S.C. 154(b) by 32 days.

(21) Appl. No.: 09/989,458

(22) Filed: Nov. 21, 2001

(65) Prior Publication Data
US 2002/0063014 A1 May 30, 2002

(30) Foreign Application Priority Data

| Nov. 29, 2000 | (JP) | ................................. 2000-362264 |
| Feb. 8, 2001 | (JP) | ................................. 2001-031717 |
| Jul. 3, 2001 | (JP) | ................................. 2001-202059 |

(51) Int. Cl.[7] .............................................. F16H 25/22
(52) U.S. Cl. .................. 180/444; 74/424.83; 74/424.87
(58) Field of Search ................................. 180/444, 443; 74/424.83, 424.87, 424.86, 424.82

(56) References Cited

U.S. PATENT DOCUMENTS

| 2,995,948 | A | * | 8/1961 | Galonska et al. | ........ 74/424.87 |
| 3,176,535 | A | * | 4/1965 | Rowland | .................. 74/424.83 |
| 4,272,476 | A | * | 6/1981 | Benton | ........................ 264/225 |
| 4,274,297 | A | * | 6/1981 | Blurock et al. | .......... 74/424.86 |
| 4,364,282 | A | * | 12/1982 | Nilsson | .................... 74/424.82 |
| 4,859,394 | A | * | 8/1989 | Benton et al. | ............... 264/225 |
| 5,284,219 | A | * | 2/1994 | Shimizu et al. | .............. 180/444 |
| 5,295,406 | A | * | 3/1994 | Alfano | ........................ 74/89.39 |
| 5,622,082 | A | * | 4/1997 | Machelski | ............... 74/424.86 |
| 6,082,210 | A | * | 7/2000 | Ise | ............................ 74/424.83 |
| 6,112,610 | A | * | 9/2000 | Welling | .................... 74/424.86 |
| 6,192,585 | B1 | * | 2/2001 | Buchanan et al. | ........ 29/898.06 |
| 6,454,042 | B1 | * | 9/2002 | Yoshida et al. | .............. 180/444 |

* cited by examiner

Primary Examiner—Avraham Lerner

(57) ABSTRACT

A portion of a steering shaft 2 capable of being advanced and retracted defines a ball screw shaft 2a of a ball screw mechanism 13. A motor rotor 10 of an electrically driven motor 8 for providing a steering assist force is externally mounted on a rotary nut 14. Mounting of the motor rotor 10 onto the rotary nut 14 is carried out so that the both can be adjustably aligned. By way of example, the rotary nut 14 has an outer peripheral surface formed with an annular protrusion 33 of a arcuate longitudinal sectional shape, having a surface thereof formed with a plurality of axially extending surface indentations 33a arranged side by side in a direction circumferentially of the rotary nut 14.

14 Claims, 20 Drawing Sheets

POWERED STEERING DEVICE AND BALL SCREW MECHANISM THEREFOR

BACKGROUND OF THE INVENTION

1. Field of the Invention

The present invention generally relates to an electrically powered steering device for an automotive vehicle and, more particularly, to the electrically powered steering device employing a ball screw mechanism for transmitting a drive output from an electrically driven motor to a steering shaft to selectively advance and retract the latter.

2. Description of the Prior Art

The electrically powered steering device is an instrument to assist the steering force of a steering wheel by means of an electrically driven motor and is currently available in various types. One of the types currently employed is of a design wherein a retractable steering shaft coupled with a steering mechanism for vehicle wheels is imparted an axially shifting force that is transmitted thereto from the steering wheel through a motion translating mechanism such as a rack-and-pinion mechanism for translating a rotary motion of the steering wheel into the axially shifting motion and, also, an axially shifting force that is transmitted thereto from an output of the electrically driven motor through a ball screw mechanism.

FIG. 21 illustrates an application of the conventional end-cap type ball screw mechanism to the electrically powered steering device. A rotary nut 51 has its outer periphery on which a rolling bearing assembly 53 for supporting the rotary nut 51 relative to a housing (not shown) and a rotor 54 of an electrically driven motor for driving the rotary nut 51 are mounted. A flange 52 is utilized for positioning the rolling bearing 53 and the rotor 54.

Since the rolling bearing 53 is of an inner race rotating type in which an inner race 53a is rotatable, the inner race 53a of the rolling bearing 53 is press-fitted onto the rotary nut 51 with an inner peripheral surface of the inner race 53a held in tight contact with an outer peripheral surface of the rotary nut 51. On the other hand, since the rotor 54 of the electric motor cannot be press-fitted in a manner similar to the rolling bearing 53, a portion of the outer peripheral surface of the rotary nut 51 on one side opposite to the rolling bearing 53 is formed with a knurled pattern 55 in the form of, for example, axial serrations so that when the rotor 54 is mounted on the rotary nut 51, ridges or projections of the knurled pattern 55 can be mechanically interlocked with the inner peripheral surface of the rotor 54. Thus, the rotor 54 and the rotary nut 51 are firmly coupled together so that a rotational torque can be transmitted from the rotor 54 to the rotary nut 51 without being accompanied by any relative rattling motion therebetween in a direction conforming to the direction of rotation thereof.

In the case of the structure shown in FIG. 21, an misalignment between the motor rotor 54 and the rotary nut 51 tends to occur during the assemblage as a result of failure to observe precision to such an extent as to result in increase of the rotational torque of the ball screw mechanism and/or variation in torque.

On the other hand, the ball screw mechanism is available in various types depending on the manner of circulation of balls, one of which is known as a bridge type.

FIG. 22 illustrates an example of the conventional bridge type ball screw mechanism. The ball screw shaft 71 has an outer periphery formed with an externally threaded helical groove 72 whereas the rotary nut 73 has an internally threaded helical groove 74 complemental to the externally threaded helical groove 72. A plurality of balls 75 are interposed between the externally and internally threaded helical grooves 72 and 74 so that the ball screw shaft 71 can be drivingly coupled with the rotary nut 73. A cylindrical barrel portion of the rotary nut 73 is formed with a plurality of oval bores 76 extending completely across the thickness of the wall of the cylindrical barrel portion of the rotary nut 73 while depleting respective portions of the internally threaded helical groove 74, and corresponding oval bridges 77 are engaged in those oval bores 76. Each of the bridges 77 is a component part in which a connecting groove segment 78 for communicating the neighboring turns of the internally threaded helical groove 74 together is formed. Thus, about one turn of the internally threaded helical groove 74 and the corresponding connecting groove segment 78 altogether define a ball rolling path for the balls 75. The balls 75 interposed between the externally and internally threaded helical grooves 72 and 74 within the ball rolling path can move along the externally and internally threaded helical grooves 72 and 74, then guided along the connecting groove segment 78 in the bridge 77 and return to the neighboring internally threaded helical groove 74 after having ridden over a screw thread on the ball screw shaft 71.

FIG. 23 illustrates in a development elevation the rotary nut 73, employed in the above described bridge type ball screw mechanism, as viewed from inside the rotary nut 73. In the bridge type ball screw mechanism, in the internally threaded helical groove 74, a non-circulating portion 79 that is a space where no ball exist (as shown by a cross-hatched area) is formed between the neighboring bridges 77 between turns of the ball rolling path (show by a hatched area) each corresponding to about one turn of the internally threaded helical groove 74.

During assemblage of the above described bridge type ball screw mechanism, as shown in FIG. 24, after a dummy shaft 80 in place of the ball screw shaft 71 has been set inside the rotary nut 73 so that a free end of the dummy shaft 80 is aligned with the position of the bridge 77, a number of the balls 75, for example, 17 balls corresponding to one turn of the circulating path are inserted into the rotary nut 73 and, thereafter, the balls 75 within the rotary nut 73 are successively guided to the circulating path one at a time by the use of pincette.

However, in this type of the ball screw mechanism, the balls 75 tend to enter the non-circulating portion 79 during the assemblage of the ball screw mechanism. If the ball screw mechanism is used in practice with the balls 75 mixed into the non-circulating portion 79, the balls 75 will detrimentally break the ball rolling path and there is a high risk that the ball screw mechanism would be consequently locked. In view of this, in assembling the above described bridge type ball screw mechanism, and particularly during insertion of the balls 75, the attendant worker has to take utmost care by carefully watching the work being performed so as to avoid entry of the balls 75 into the non-circulating portion 79 and/or by counting the number of the balls 75 being inserted into the circulating path. However, even though the utmost care is taken during the assemblage, no complete avoidance of the balls 75 being mixed into the non-circulating portion 79 is possible and, therefore, the possibility of the ball screw mechanism being locked cannot be avoided sufficiently.

SUMMARY OF THE INVENTION

Accordingly, the present invention has been devised to substantially eliminate the above discussed problems and is intended to provide an improved electrically powered steering device that is easy to assemble and in which any possible misalignment of the rotor of the electrically driven motor relative to the nut of the ball screw mechanism can be compensated for and, therefore, an undesirable increase of the rotational torque and variation in torque resulting from the misalignment can advantageously be eliminated.

Another important object of the present invention is to provide an improved bridge type ball screw mechanism for use in the electrically powered steering device, which is easy to assemble and in which an undesirable entry of the balls into the non-circulating portion during assemblage can be effectively and securely avoided.

In order to accomplish these objects of the present invention, a first aspect of the present invention provides an electrically powered steering device which comprises a housing, a steering shaft drivingly connected with a steering mechanism for steering wheels and extending through the housing, a motion translating mechanism for translating a rotary motion of a steering wheel into a force necessary to move the steering shaft in a direction axially thereof, a ball screw mechanism including a rotary nut and a ball screw shaft defined by a portion of the steering shaft, and an electric drive motor having a motor rotor, said motor rotor having one end portion mounted on an end portion of the rotary nut, characterized in that the rotary nut and that end portion of the motor rotor are mounted relative to each other in an adjustably alignable fashion.

According to this feature, since the motor rotor of the electrical drive motor is mounted on the rotary nut in a manner enabling an alignment therebetween to be adjusted, any possible misalignment resulting from the precision such as a radial offset between the motor rotor and the rotary nut can be compensated for by the adjustable alignment. Accordingly, an undesirable increase of and/or variation in the rotational torque resulting from the misalignment can be eliminated.

In the practice of the present invention, the motor rotor has a cylindrical inner peripheral surface and the rotary nut has a cylindrical outer surface. The cylindrical outer surface of the rotary nut may have an outer mount surface area formed with a radially outwardly extending protrusion of an arcuate longitudinal sectional shape. In this case, the radially outwardly extending protrusion are used to avoid a rotation of the rotary nut relative to the motor rotor and preferably has a multiplicity of surface indentations arranged in side-by-side fashion in a direction circumferentially of the rotary nut, whereby when the motor rotor is capped onto the rotary nut with the radially outwardly extending protrusion situated inside the motor rotor, a slight radial gap is formed between the inner peripheral surface of the motor rotor and the outer peripheral surface of the rotary nut. The radially outwardly extending protrusion may be an annular protrusion protruding radially outwardly of the rotary nut.

With the radially outwardly extending protrusion of an arcuate longitudinal sectional shape so formed that when the motor rotor is capped onto the rotary nut, the slight radial gap is formed between the inner peripheral surface of the motor rotor and the outer peripheral surface of the rotary nut, alignment between the motor rotor and the rotary nut can be adjusted about the protrusion so that any possible misalignment therebetween can be compensated for. Any possible raffling between the motor rotor and the rotary nut with respect to the direction of rotation can be avoided by the presence of the surface indentations formed on the protrusion, and therefore rotation of the motor rotor can be assuredly transmitted to the rotary nut. While both the aligning capability and the elimination of the rattling in the direction of rotation can hardly be attained simultaneously, the present invention has made it possible to attain both the aligning capability and the elimination of the raffling in the direction of rotation simultaneously because the annular protrusion is chosen to be a portion where the surface indentations for the prevention of the rattling are to be formed.

Also, in the practice of the present invention, the motor rotor has a cylindrical inner peripheral surface and the rotary nut has a cylindrical outer surface. The inner peripheral surface of the motor rotor may have an inner mount surface area formed with a radially inwardly extending protrusion of an arcuate longitudinal sectional shape. The radially inwardly extending protrusion are used for avoiding rotation of the rotary nut relative to the motor rotor, and the outer peripheral surface of the rotary nut which confronts the radially inwardly extending protrusion of the motor rotor may have a multiplicity of surface indentations arranged in side-by-side fashion in a direction circumferentially of the rotary nut, whereby when the motor rotor with the radially inwardly extending protrusion situated in the inside is capped onto the rotary nut, a slight radial gap is formed between the inner peripheral surface of the motor rotor and the outer peripheral surface of the rotary nut.

Even with this structure, alignment between the motor rotor and the rotary nut can be adjusted about the protrusion so that any possible misalignment therebetween can be compensated for. Any possible rattling between the motor rotor and the rotary nut with respect to the direction of rotation can be avoided by the presence of the surface indentations formed on the protrusion, and therefore rotation of the motor rotor can be assuredly transmitted to the rotary nut.

Where the protrusion is formed on the outer peripheral surface of the rotary nut or on the inner peripheral surface of the motor rotor as discussed above, the surface indentations may be formed by means of a form rolling technique. The use of the form rolling technique makes it easy to form the surface indentations.

Also, where the motor rotor has a cylindrical inner peripheral surface having an inner surface mount area defined therein and the rotary nut has a cylindrical outer surface having an outer surface mount area defined therein, with the outer surface mount area adapted to be covered by the inner surface mount area when the motor rotor is mounted onto that end portion of the rotary nut, at least three radial recesses of a semicircular sectional shape are preferably formed in each of the inner and outer surface mount areas in alignment with each other. In this case, a corresponding number of balls are each received in part in the respective radial recess in the inner surface mount area and in part within the mating radial recess in the outer surface mount area when the motor rotor is mounted onto that end portion of the rotary nut, so that a slight gap is formed between the inner peripheral surface of the motor rotor and the outer peripheral surface of the rotary nut. In other words, in this alternative configuration, instead of the use of the protrusion and the surface indentations, the radial recesses are utilized together with the corresponding balls.

Even this alternative configuration, the use of the plural balls and the radial recesses accommodating the respective balls makes it possible to allow the rotational torque to be transmitted from the motor rotor to the rotary nut and also to achieve an adjustable alignment between the motor rotor and the rotary nut to thereby compensate for any possible misalignment therebetween.

Where the balls are employed in combination with the radial recesses, at least one of the inner and outer mount surface areas may be formed with an axially extending insert groove communicating between each of the radial recesses and an annular end face of the rotary nut adjacent the motor rotor or an annular end face of the motor rotor adjacent the rotary nut. The respective insert groove may be formed on either the outer peripheral surface of the rotary nut or the inner peripheral surface of the motor rotor, or the both.

The formation of the insert grooves allows the balls to be smoothly guided in between the radial recesses in the motor rotor and the rotary nut.

A second aspect of the present invention provides an electrically powered steering device which includes a housing, a steering shaft drivingly connected with a steering mechanism for steering wheels and extending through the housing, a motion translating mechanism for translating a rotary motion of a steering wheel into a force necessary to move the steering shaft in a direction axially thereof, a ball screw mechanism including a rotary nut and a ball screw shaft defined by a portion of the steering shaft, and an electric drive motor having a motor rotor, said motor rotor having one end portion mounted on an end portion of the rotary nut. In this electrically powered steering device, in order to provide a slight radial gap between the inner peripheral surface of the motor rotor and the outer peripheral surface of the rotary nut, not only do the rotary nut and the motor rotor have cylindrical outer and inner peripheral surfaces, respectively, but the rotary nut has at least three circumferentially spaced recesses defined in an outer mount surface area of the outer peripheral surface thereof, and the motor rotor has radially extending throughholes defined therein so as to extend completely across a wall of the motor rotor at respective locations where, when the motor rotor is mounted onto the rotary nut, the radial throughholes align respectively with the recesses in the rotary nut. Engagement members are accommodated within the radial throughholes in the motor rotor; respectively, and plug members are externally inserted into the throughholes to clog radially outward openings of those radial throughholes to urge the respective engagement members towards the corresponding recesses in the rotary nut.

According to this structure, since the motor rotor is mounted on the rotary nut with the slight radial gap formed between the inner peripheral surface of the motor rotor and the outer peripheral surface of the rotary nut and since the engagement members are carried by the motor rotor in alignment with the radial recesses in the rotary nut, by adjusting the engagement between the engagement members with the radial recesses and also by the alignment function obtained at the points of engagement between the engagement members and the corresponding radial recesses, any possible misalignment of the motor rotor relative to the rotary nut can be compensated for. For this reason, an undesirable increase of and/or variation in the rotational torque can be eliminated advantageously. Also, since the engagement members are accommodated within the throughholes defined in the motor rotor, even though the structure is employed in which the motor rotor and the rotary nut are mounted relative to each other by means of the engagement members, it can easily be assembled.

Each of the radial recesses in the rotary nut may be of a semispherical sectional shape or flat-bottomed. Where each radial recess is of a semispherical sectional shape, each of the engagement members preferably has at least one end shaped to represent a semispherically rounded in a shape complemental to the sectional shape of the corresponding recess. On the other hand, where each radial recess is flat-bottomed, each of the engagement members preferably has a flat end face complemental to the shape of the bottom of the corresponding radial recess.

Where each radial recess is of a semispherical sectional shape and each of the engagement members preferably has at least one end shaped to represent a semispherically rounded in a shape complemental to the sectional shape of the corresponding recess, as is the case where the balls are employed, a compensating function to compensate for a possible misalignment which would occur in transmission of the rotational torque and in an alignment function can be obtained by the engagement members each having a rounded end.

Where each radial recess is flat-bottomed and, correspondingly, each of the engagement members has the flat end face, no automatic alignment function can be obtained, but during assemblage of the rotary nut and the motor rotor together, a possible misalignment between the motor rotor and the rotary nut can be eliminated by adjusting the amount of each engagement member urged into the corresponding radial recess to such an extent as to eliminate any possible rocking motions of any one of the rotary nut and the motor rotor. Also, in the case of this structure, unlike the case in which inclination is automatically aligned, it is possible to avoid occurrence of inclination of the rotary nut relative to the motor rotor.

Where each of the throughholes is to be clogged by the corresponding plug member after the associated engagement member has been inserted into the throughhole, the respective plug member preferably has an external helical thread formed on an outer periphery thereof for adjustable threading into the corresponding throughhole.

The use of the externally helically threaded plug member that can be fastened into the corresponding throughhole makes it possible to allow the plug member to be easily mounted in the throughhole and also to adjust the gripping force acting from the motor rotor to the rotary nut by way of the associated engagement member when the plug member has been fastened. For this reason, the gripping force at any point in the direction circumferentially of the rotary nut can be equalized by the adjustment discussed above.

In the structure wherein the throughholes, the engagement members and the corresponding radial recesses are employed, in place of the semispherically sectioned radial recesses, the radial recesses may have an oval shape having a long axis lying parallel to a longitudinal axis of the rotary nut, or an elliptical shape depicted by connecting two semicircles through parallel straight lines.

Where the radial recesses of the oval or elliptical shape having its long axis lying parallel to the longitudinal axis of the rotary nut are employed, an assured transmission of the rotational torque can be achieved with elimination of any rattling motion in a rotational direction while permitting a displacement in position between the throughholes in the motor rotor and the radial recesses in the rotary nut in a direction axially of the rotary nut. A compensating function to compensate for a misalignment by means of the alignment function can be obtained in a manner similar to the case in which each of the throughholes is a cylindrical hole.

In a preferred embodiment of the present invention, an elastic member may be disposed within each of the throughholes and interposed between each of the plug members and the associated engagement member. The use of the elastic member in this way is effective to render the gripping force acting on the rotary nut to be uniform.

Where the plug members are threaded into the corresponding throughholes, the interposition of the elastic member between the plug member and the engagement member within each of the throughhole is advantageous in that the gripping force can be adjusted by threading the respective plug member into the associated throughhole.

According to a third aspect of the present invention, there is provided a ball screw mechanism for the electrically powered steering device, which includes a ball screw shaft; a rotary nut having an inner peripheral surface formed with an internally threaded helical groove cooperating with the ball screw shaft to define a ball rolling guideway between the ball screw shaft and the internally threaded helical groove; a series of balls disposed in the ball rolling guideway for transmitting a force between the rotary nut and the ball screw shaft; a plurality of bridge members secured to the rotary nut and each having a connecting groove segment defined therein for communicating neighboring convolutions of the internally threaded helical groove in the rotary nut. The convolution of the internally threaded helical groove has a non-circulating portion delimited between the neighboring bridge members and where no ball move therein and in that a filler member is disposed in the non-circulating portion to fill up such non-circulating portion.

With this ball screw mechanism, since the non-circulating portion has the filler member disposed therein, any possible mixing of some of the balls into the non-circulating portions of the internally threaded helical groove during insertion of the balls successively into the ball rolling guideway can advantageously be avoided by the presence of the filler member. For this reason, there is no possibility of some of the balls intruding into the non-circulating portions as a result of an assembling error and, also, any possible locking of the ball screw mechanism which would other wise resulting from intrusion of some of the ball into non-lubricating portions can be eliminated assuredly.

In the practice of this invention, the filler member may be so shaped as to represent a shape generally similar to the non-circulating portion and is made of a separate elastic member adapted to be resiliently disposed in the non-circulating portion between the neighboring bridge members.

When the filler member is prepared from a member separate from the rotary nut, no machining to form in the rotary nut a portion corresponding to the filler member is needed and, therefore, the rotary nut may be a standard rotary nut for a ball screw mechanism having no filler member. Also, since the filler member has a shape generally similar to the shape of the non-circulating portion and is resiliently mounted in between the neighboring bridge members, mounting of the filler member onto the rotary nut can easily be achieved.

In the practice of this invention, each of the bridge member may have positioning arms engageable in the convolution of the internally threaded helical groove in the rotary nut for positioning the respective bridge member relative to the rotary nut with respect to a direction axially thereof. In this case, the arms are disposed to fill up the non-circulating portion.

The positioning arms of each bridge member are used to assuredly position the respective bridge member with respect to the axial direction. When these positioning arms are concurrently used as the filler member for filling up the non-circulating portion of the internally threaded helical groove in the rotary nut, each of the positioning arms may have a length longer than the standard one and no dedicated filler member need be disposed, thereby reducing the number of component parts and also the number of steps of assemblage.

Each of the bridge members may be inserted into a bridge receiving opening, defined in the rotary nut, from inside of the rotary nut. The structure in which each bridge member is fixed in position having been inserted into the associated bridge receiving opening from inside of the rotary nut eliminates the need to use any stop member for avoiding separation of the respective bridge member from the rotary nut and, therefore, the respective bridge member can easily be fixed in position.

Each of the bridge members may have a plurality of connecting groove segments defined therein. Formation of the plural connecting groove segments in each bridge member makes it possible to reduce the pitch between the neighboring convolutions of the internally threaded helical groove as compared with the bridge member having only one connecting groove segment. For this reason, the number of the balls that can be used can be increased to thereby increase the load capacity with no need to increase the axial length of the rotary nut.

Preferably, each of the bridge members is made of a sintered alloy. Where each bridge member is made of the sintered alloy, it can be manufactured by molding and sintering by means of an injection molding process or the like. Accordingly, neither machining nor grinding is needed, resulting in a good productivity. Thus, a less expensive manufacture is possible.

The present invention also provides an electrically powered steering device which includes a housing, a steering shaft drivingly connected with a steering mechanism for steering wheels and extending through the housing, a motion translating mechanism for translating a rotary motion of a steering wheel into a force necessary to move the steering shaft in a direction axially thereof, a ball screw mechanism including a rotary nut and a ball screw shaft defined by a portion of the steering shaft, and an electric drive motor having a motor rotor having one end portion mounted on an end portion of the rotary nut, wherein the ball screw mechanism is of a bridge type as described in any one of the above described inventions.

By this structure, the ball screw mechanism for transmitting an output from the electric drive motor to the rotary nut can be designed safe with no locking taking place in the ball screw mechanism, and, therefore, the safety factor and the reliability of the electrically powered steering device can be increased advantageously.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
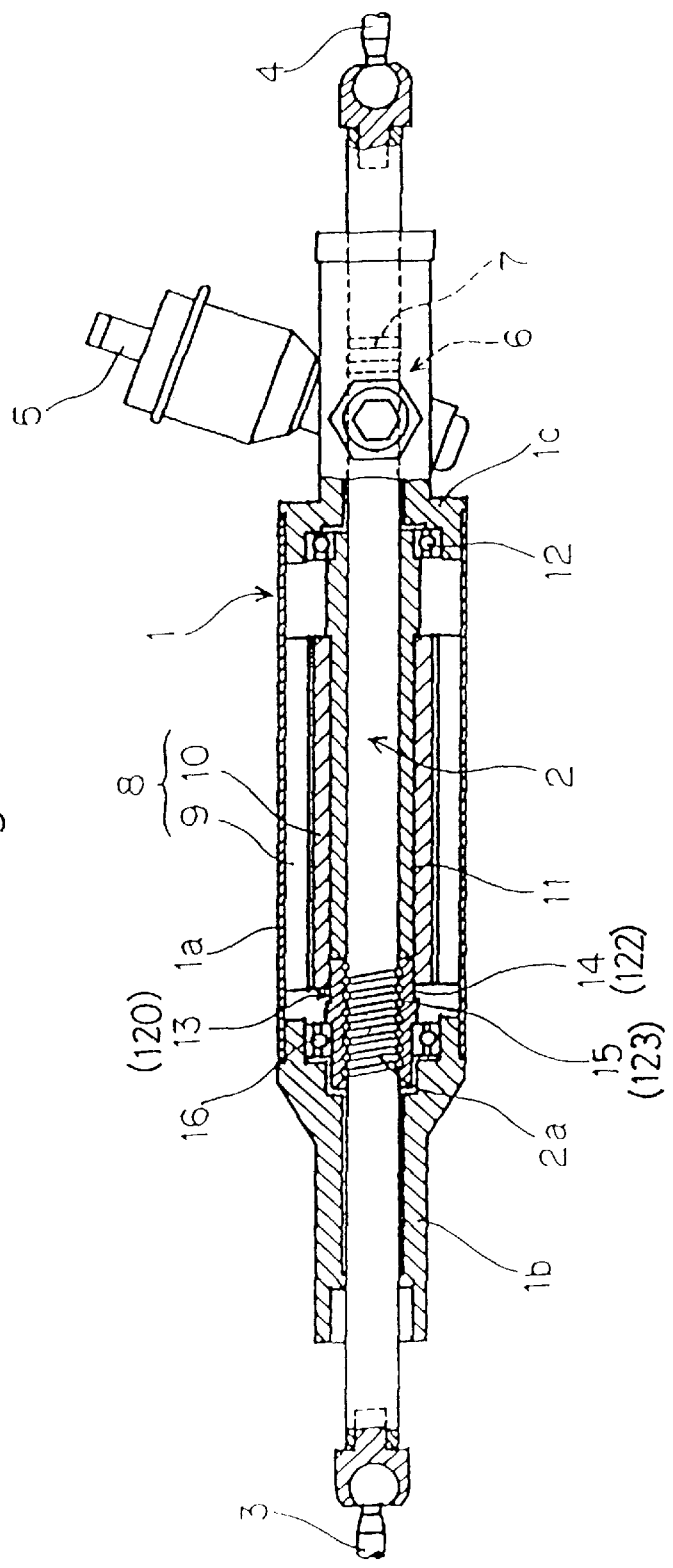
FIG. 1 is a longitudinal side view of a ball screw mechanism for use in association with an electrically powered steering device according to a first preferred embodiment of the present invention.

Referring to FIGS. 1 to 3B, a ball screw mechanism according to a first preferred embodiment of the present invention will first be described. Referring particularly to FIG. 1, a generally cylindrical housing 1 has a bracket (not shown) through which the housing 1 is fixedly connected to an automobile chassis or body structure. This housing 1 includes a steering shaft 2 rotatably extending through the housing 1 and drivingly connected at its opposite ends with respective tie rods 3 and 4 which are in turn drivingly connected with a steering mechanism (not shown) for steering, for example, front tire wheels.

A steering rod 5 extends diagonally upwardly from one end portion of the cylindrical housing 1 and has an upper end fixedly connected with a steering wheel (not shown). The steering rod 5 is rotatably supported and, when the steering wheel is turned either clockwise or counterclockwise with respect to the longitudinal axis of the steering rod 5, rotation of the steering rod 5 is transmitted to the steering shaft 2 through a motion translating mechanism 6, positioned adjacent a lower end of the steering rod 5, so that the steering shaft 2 can be moved axially within the cylindrical housing 1. The motion translating mechanism 6 includes a rack 7 which may be a part of, or otherwise formed on, a longitudinal portion of the steering shaft 2, and a pinion (not shown) fixedly mounted on the lower end of the steering rod 5 and meshed with the rack 7 within the cylindrical housing 1. Although not shown, a steering torque detector is mounted in association with the steering rod 5 for detecting a steering torque with which the steering wheel is turned.

The cylindrical housing 1 is of a generally three-piece construction including an intermediate cylindrical body 1a and generally tubular end members 1b and 1c fixedly plugged into respective opposite ends of the intermediate cylindrical body 1a. A generally cylindrical stator 9 of an electric drive motor 8 is coaxially disposed within the intermediate cylindrical body 1a of the housing 1 and positioned substantially intermediate of the length of the housing 1. This cylindrical stator 9 is comprised of a core and a stator coil. A cylindrical rotor 10 of the electric drive motor 8 is housed within the cylindrical stator 9 and has an outer peripheral surface spaced a slight distance radially inwardly from an inner peripheral surface of the stator 9 to define a gap therebetween. The cylindrical rotor 10 is made of a magnet or a magnetic material and is mounted on a sleeve 11 for rotation together therewith. The steering shaft 2 referred to hereinbefore extends within the sleeve 11 for movement in a direction axially thereof. The electric drive motor 8 is controlled by a motor control circuit (not shown) according to the torque detected by the steering torque detector.

One of opposite ends of the sleeve 11 adjacent, for example, the steering rod 5 as shown is rotatably supported within the housing 1 by means of a bearing 12. The bearing 12 may be a single bearing or a combination of a plurality of bearings and is of a type capable of supporting not only a radial load, but also a thrust load.

Rotation of the electric drive motor 8 can be transmitted to the steering shaft 2 through a ball screw mechanism 13 to move the steering shaft 2 axially within the housing 1. The ball screw mechanism 13 includes a ball screw shaft 2a which is represented by an axial portion of the steering shaft 2.

A rotary nut 14 forming a part of the ball screw mechanism 13 is positioned within the housing 1 and is supported for rotation relative to the housing 1 by means of a bearing 16 mounted on an outer periphery thereof. One end of the motor rotor 10 of the electric drive motor 8 is capped onto the outer periphery off the rotary nut 14. Specifically, that end of the motor rotor 10 adjacent the rotary nut 14 extends axially outwardly beyond the sleeve 11 and is in turn capped onto the rotary nut 14 as clearly shown in FIG. 1.

The bearing 16 may be a single bearing or a combination of a plurality of bearings and is of a type capable of supporting not only a radial load, but also a thrust load. In the illustrated embodiment, however, the bearing 16 is employed in the form of a rolling bearing such as, for example, an angular ball bearing, including inner and outer races with a plurality of rolling elements interposed between these inner and outer races.

Figure 2:
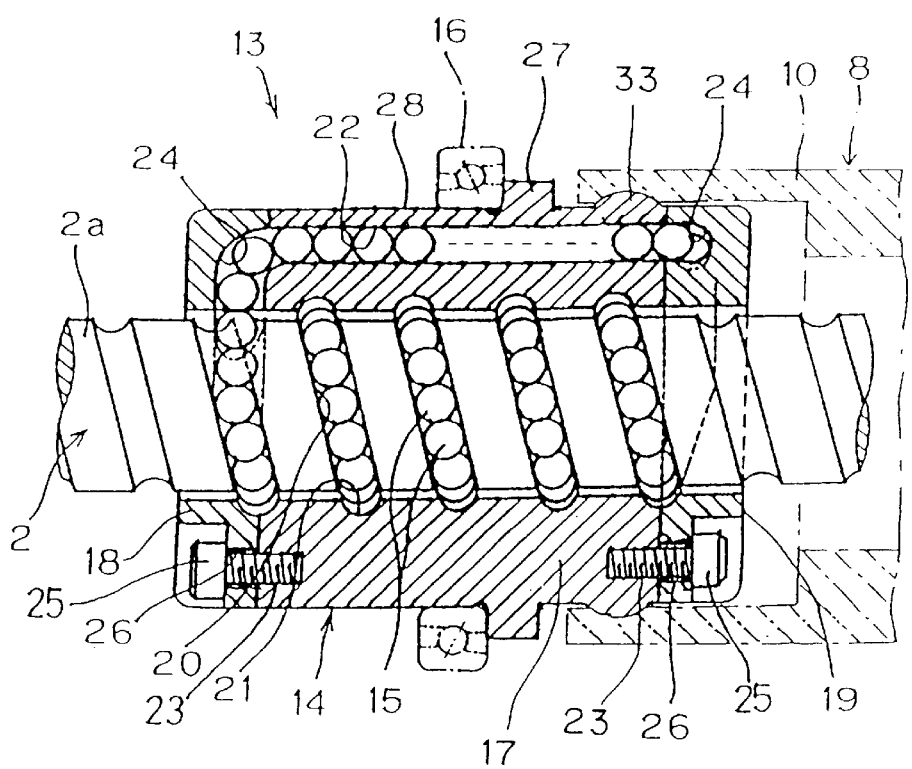
FIG. 2 is a longitudinal sectional view, on an enlarged scale, of the ball screw mechanism shown in FIG. 1.

The details of the ball screw mechanism 13 will now be described with particular reference to FIG. 2. The ball screw mechanism 13 includes a ball screw shaft 2a, a rotary nut 14, and a series of balls 15 interposed between the ball screw shaft 2a and the rotary nut 14.

The illustrated ball screw mechanism 13 is of a so-called end cap type in which the rotary nut 14 is made up of a nut body 17 having its opposite ends to which respective end caps 18 and 19 are connected. The ball screw mechanism 13 that can be employed in the practice of the present invention may not be always limited to the end cap type, but may be of any other type such as, for example, a bridge type or a return tube type and, even in this case, effects brought about by the use of an aligning capability in accordance with the present invention can be equally obtained.

The nut body 17 has an internally threaded helical groove 21 cooperable with an externally threaded helical groove 20, defined on the ball screw shaft 2a, to thereby define a ball rolling guideway between the internally and externally threaded helical grooves 21 and 20 for rolling motion of the series of the balls 15, and a circulating passage 22 defined therein for circulation of the series of the balls 15 therethrough. The nut body 17 has its opposite annular end faces each formed with a plurality of bolt holes 23. The ball circulating passage 22 extends in the wall of the nut body 17 in a direction axially thereof, with its opposite ends opening outwardly from the associated annular end faces of the nut body 17.

The end caps 18 and 19 secured to the respective ends of the nut body 17 serve to allow the balls 15 to be circulated between the externally threaded helical groove 20 on the ball screw shaft 2a and the ball circulating passage 22 and are each in the form of a ring shape having an inner diameter equal to that of the nut body 17. An annular inner end face of each of the end caps 18 and 19 that is held in abutment with the adjacent annular end face of the but body 17 is formed with a grooved guide passage 24 for guiding the series of the balls 15 from the ball rolling guideway, defined between the internally and externally threaded helical grooves 21 and 20, to the ball circulating passage 22 or from the ball circulating passage 22 into the ball rolling guideway. The grooved guide passage 24 defined in an inner peripheral surface of each of the end caps 18 and 19 is made up of a helical groove segment angularly extending a certain angle not exceeding 360° about the longitudinal axis of the ball screw shaft 2a and communicated with the internally threaded helical groove 21 in the nut body 17, and a slant groove segment extending slantwise in a direction radially outwardly from the helical groove segment.

Each of the end caps 18 and 19 is formed with bolt holes 26 alignable respectively with the corresponding bolt holes 23 defied in each end of the nut body 17, and each bolt hole 26 has an outer end opposite to the nut body 17 that is inwardly drilled to define a counterbore for receiving a head of a bolt 25. To firmly connect each end cap 18 and 19 with the corresponding end of the nut body 17, the bolts 25 are, after having been passed through the corresponding bolt holes 26 in each end caps 18 and 19, are fastened into the respective bolt holes 23 in the nut body 17 with the bolt heads 25 seated within the associated counterbores.

Figure 3A:
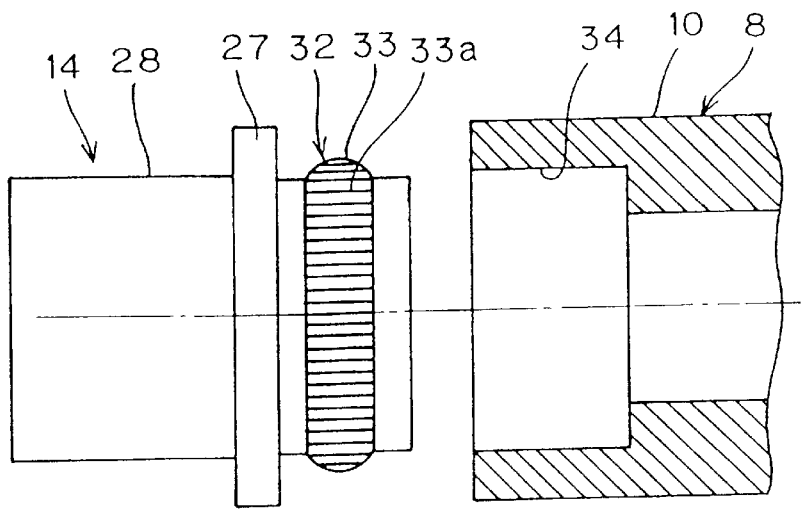
FIG. 3A is an exploded view showing a rotary nut and a motor rotor both forming respective parts of the ball screw mechanism according to the first embodiment of the present invention.
Figure 3B:
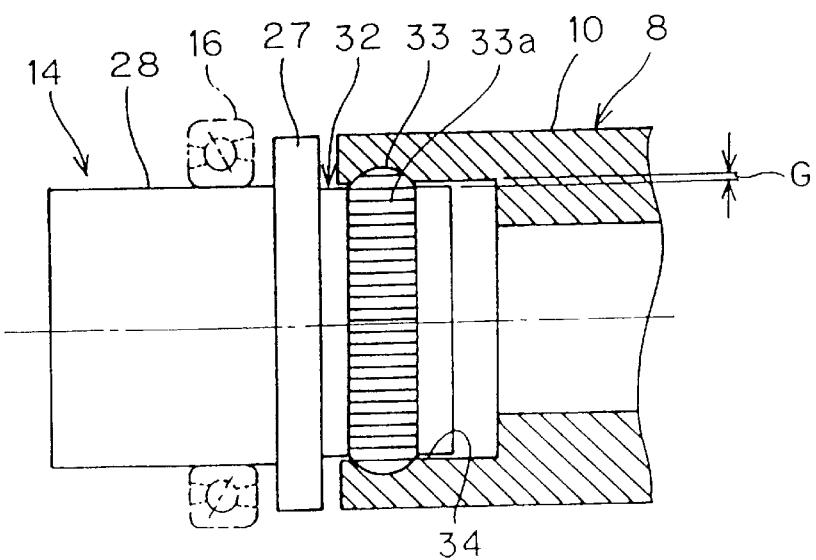
FIG. 3B is a longitudinal sectional view showing an assembly of the rotary nut and the motor rotor shown in FIG. 3A.

The rotary nut 14 has its outer periphery so shaped as will now be described. The rotary nut 14 is of a substantially cylindrical shape and is formed with a radially outwardly extending annular positioning flange 27 formed on an outer peripheral surface thereof at a location generally intermediate of the length of the rotary nut 14 as shown in FIG. 3. Opposite outer peripheral surface portions of the rotary nut 14 on respective sides of the annular positioning flange 27 define a cylindrical surface area 28, on which a rolling bearing 16 is mounted under interference fit, and an outer mount surface area 32 on which a motor rotor 10 of an electrically driven motor 8 is mounted. The outer mount surface area 32 of the rotary nut 14 has an annular protuberance 33 of a substantially arcuate cross sectional shape extending radially outwardly of the rotary nut 14. A radially outer arcuate surface of the annular protuberance 33 is formed with surface indentations or irregularities 33a for interlocking the rotary nut 14 and the motor rotor 10 firmly together to avoid a relative rotation therebetween. In other words, an outer peripheral portion of the rotary nut 14 where the surface indentations or irregularities 33a are to be formed on the outer mount surface area 32 of the rotary nut 14 is so shaped as to protrude radially outwardly over the circumference thereof to define the annular protuberance 33. More specifically, the surface indentations 33a represents a knurled pattern made up of a multiplicity of axially extending ridges and valleys alternating in a direction circumferentially of the rotary nut 14. These surface indentations 33a can be formed by a form rolling technique using a knurling roll or any other tool. The outer mount surface area 32 excluding the annular protuberance 33 has an outer diameter of such a value that when the motor rotor 10 is mounted externally on the outer mount surface area 32 of the rotary nut 14 as shown in FIG. 3B, a slight radial gap G can be defined between an inner peripheral surface of the motor rotor 10 and the outer mount surface area 32. As a matter of course, when the motor rotor 10 is so mounted on the outer mount surface area 32, the annular protuberance 33 is press-fitted into a corresponding portion of the inner peripheral surface of the motor rotor 10.

With respect to a material, the rotary nut 14 is made of a metallic material that has been hardened by, for example, carburization, whereas the motor rotor 10 is made of a metallic material that is not heat treated, for example, soft steel.

The operation and function of the structure described above will now be described. Assuming that the automotive vehicle is driven straight without the steering wheel being substantially turned, a steering torque detector (not shown) associated with the steering rod 5 in FIG. 1 provides no output and, therefore, the electric drive motor 8 is held in inoperative position by a motor control means (not shown). Accordingly, the electrically powered steering device is in position not to provide an assisted steering force.

In the event that the steering wheel is turned, the steering torque detector associated with the steering rod 5 provides an output therefrom and, under the control of the motor control circuit, the electric drive motor 8 rotates the rotor 10. As the rotor 10 is rotated, the rotary nut 14 of the ball screw mechanism 13 undergoes rotation together with the rotor 10, causing the steering shaft 2, which is an integral part of the ball screw shaft 2a, to move axially to thereby produce an assisted steering force.

At this time, the balls 15 of the ball screw mechanism 13 rollingly move within the ball rolling guideway defined between the inner and outer helical grooves 20 and 21 and circulate from the ball rolling guideway back to the ball rolling guideway through the circulating passage 22 and the grooved guide passage 24 defined in each of the end caps 18 and 19. In this way, the steering force of the steering wheel can be assisted by the electric drive motor 8.

In the electrically powered steering device of the structure described above, since the outer mount surface area 32 of the rotary nut 14 is formed with the annular protuberance 33 of the arcuate sectional shape and the motor rotor 10 is mounted on the rotary nut 14 so as to define the radial gap G between the motor rotor 10 and the rotary nut 14 in the presence of the annular protuberance 33, alignment between the motor rotor 10 and the rotary nut 14 can be adjusted about the annular protuberance 33 so that any possible misalignment therebetween can be compensated for. Any possible rattling between the motor rotor 10 and the rotary nut 14 with respect to the direction of rotation can be avoided by the presence of the surface indentations 33a formed on the annular protuberance 33, and therefore rotation of the motor rotor 10 can be assuredly transmitted to the rotary nut 14. While both the aligning capability and the elimination of the rattling in the direction of rotation can hardly be attained simultaneously, the present invention has made it possible to attain both the aligning capability and the elimination of the rattling in the direction of rotation simultaneously because the annular protuberance 33 is chosen to be a portion where the surface indentations 33a for the prevention of the rattling are to be formed. It is pointed out that since the surface indentations 33a are formed by the use of the form rolling technique, they can be formed easily.

Figure 4A:
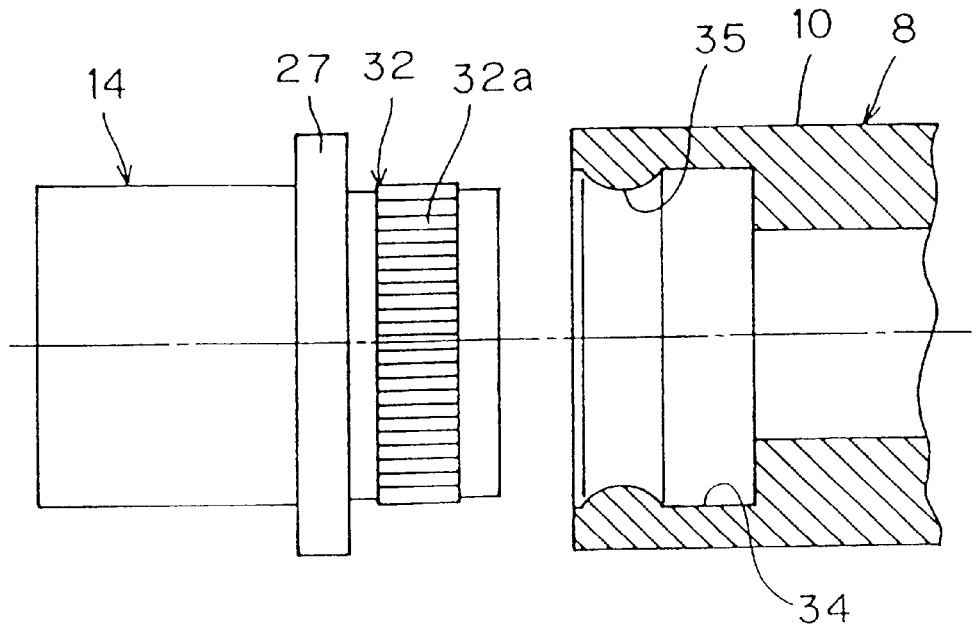
FIG. 4A is an exploded view showing a rotary nut and a motor rotor both forming respective parts of the ball screw mechanism according to a second preferred embodiment of the present invention.
Figure 4B:
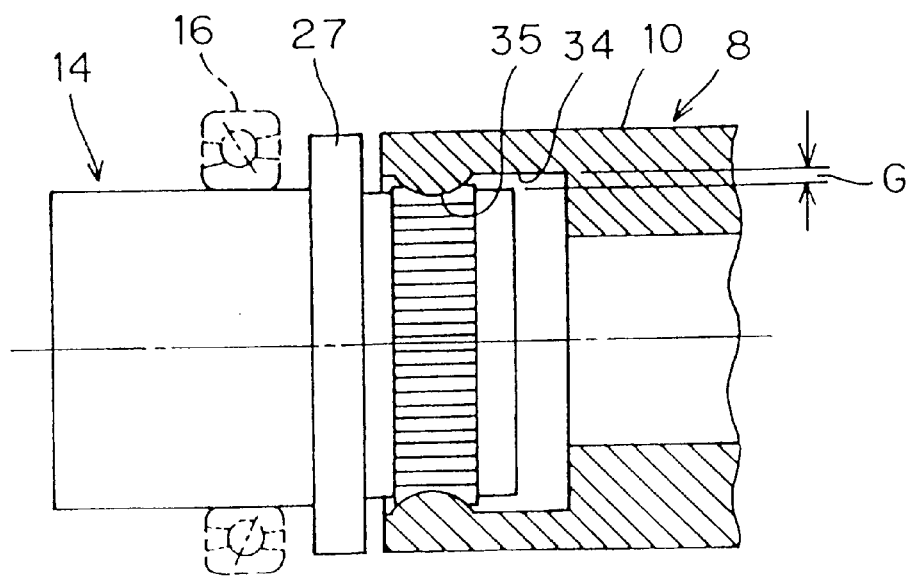
FIG. 4B is a longitudinal sectional view showing an assembly of the rotary nut and the motor rotor shown in FIG. 4A.

FIG. 4 illustrates a second preferred embodiment of the present invention. In this embodiment shown in FIG. 4, an inner mount surface area 34 of an inner peripheral surface of the motor rotor 10 that is to be mounted on the mounting surface area 32 of the rotary nut 14 is formed with an annular protuberance 35 of an arcuate sectional shape protruding radially inwardly of the motor rotor 10. The outer mount surface area 32 of the rotary nut which confronts the annular protuberance 35 is formed with surface indentations 32a in the form of a knurled pattern made up of a multiplicity of axially extending ridges and valleys alternating in a direction circumferentially of the rotary nut 14. These surface indentations 32a can be formed by a form rolling technique using a knurling roll or any other tool. The inner mount surface area 34 of the inner peripheral surface of the motor rotor 10 excluding the annular protuberance 35 has an inner diameter of such a value that when the motor rotor 10 is mounted on the externally outer mount surface area 32 of the rotary nut 14 as shown in FIG. 4B, a slight radial gap G can be defined between the inner peripheral surface of the motor rotor 10 and the outer mount surface area 32 of the rotary nut 14. Other structural features than those described above are similar to those in the previously described first embodiment and, therefore, the details thereof are not reiterated.

Even in this second embodiment, alignment between the rotary nut 14 and the motor rotor 10 that is to be mounted on the rotary nut 14 can be tolerated by the socket portion of the motor rotor 10 and, therefore, any possible misalignment resulting from fixed mounting of the motor rotor 10 on the rotary nut 14 can be compensated for.

It is to be noted that in any one of the first and second embodiments of the present invention, the protuberances 33 and 35 have been shown and described as representing an annular shape extending circumferentially of the rotary nut 14, the protuberances 33 and 35 may not be limited to the annular shape, but may be made up of a plurality of radially outwardly protruding bumps spaced an equal distance from each other in a direction circumferentially of the rotary nut 14. In this case, each bump may be of a semispherical shape or may extend a predetermined distance in the circumferential direction to represent a generally arcuate shape.

Figure 5A:
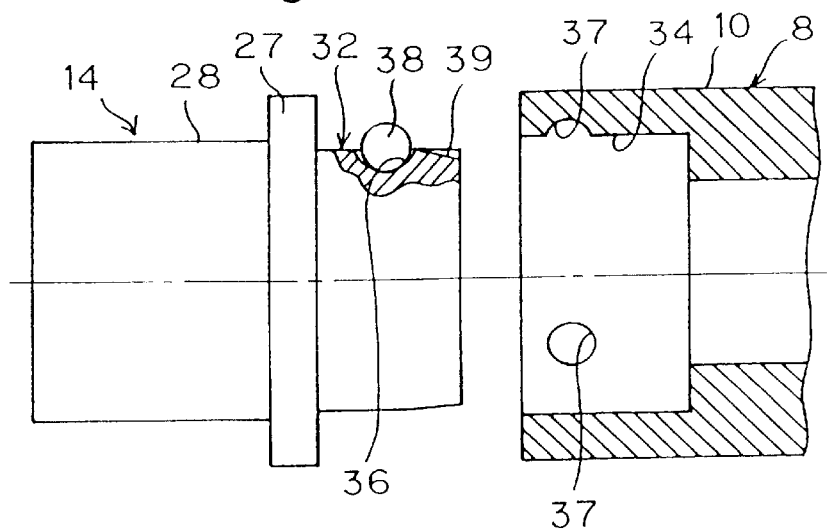
FIG. 5A is an exploded view showing a rotary nut and a motor rotor both forming respective parts of the ball screw mechanism according to a third preferred embodiment of the present invention.
Figure 5B:
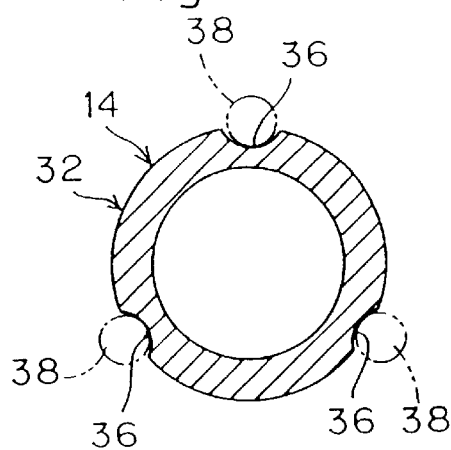
FIG. 5B is a transverse sectional view of the rotary nut shown in FIG. 5A.
Figure 5C:
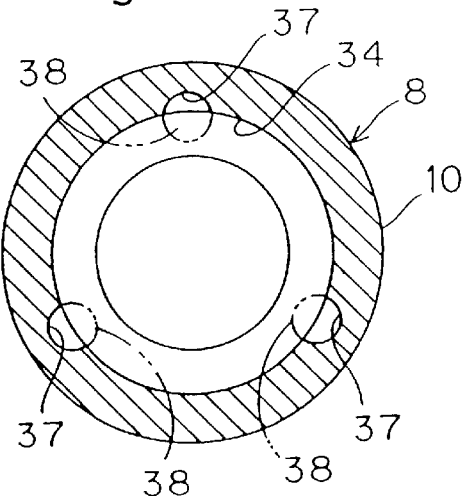
FIG. 5C is a transverse sectional view of the motor rotor shown in FIG. 5A.
Figure 5D:
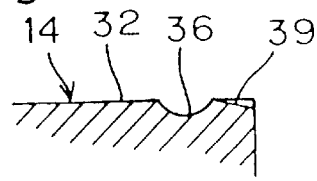
FIG. 5D is a fragmentary longitudinal sectional view of a portion of the rotary nut shown in FIG. 5A.
Figure 5E:
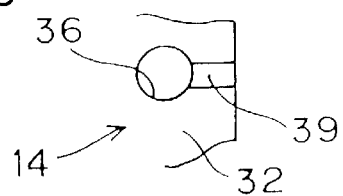
FIG. 5E is a fragmentary plan view of that portion of the rotary nut shown in FIG. 5A.
Figure 6:
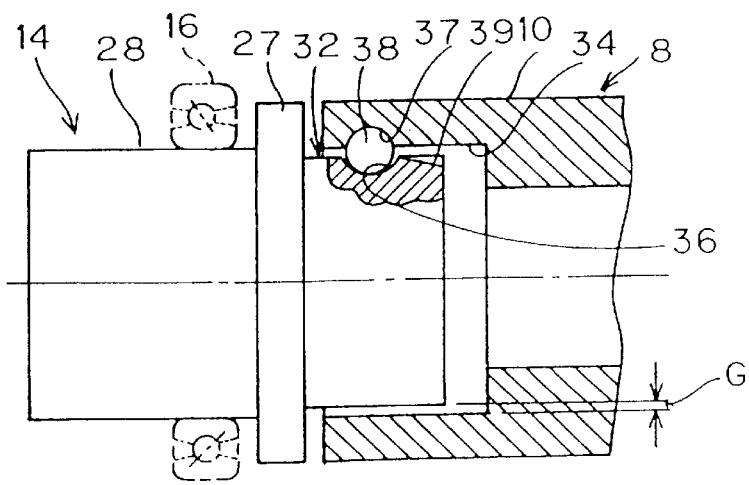
FIG. 6 is a longitudinal side view, with a portion shown in section, of the assembly of the rotary nut and the motor rotor forming respective parts of the ball screw mechanism according to the third embodiment of the present invention.

FIGS. 5 and 6 illustrate a third preferred embodiment of the present invention. In this embodiment, the rotary nut 14 is formed with at least three radially inwardly and semispherically recessed seats 36 defined in the outer mount surface area 32 thereof at respective locations spaced an equal distance in a direction circumferentially thereof. On the other hand, the motor rotor 10 is also formed with a corresponding number of radially outwardly and semispherically recessed seats 37 defined in the inner mount surface area 34 thereof at respective locations alignable with the recessed seats 36 in the rotary nut 14. In a condition in which the motor rotor 10 is mounted on the rotary nut 14 as shown in FIG. 6, balls 38 are interposed between the inner mount surface area 34 and the outer mount surface area 32, each seated in part within the corresponding recessed seat 36 and in part within the corresponding recessed seat 37.

The outer diameter of the rotary nut 14 at the outer mount surface area 32 excluding the recesses seats 36 and the inner diameter of the motor rotor 10 at the inner mount surface area 34 have such a relationship that in the condition in which the motor rotor 10 is mounted on the rotary nut 14 with the balls 38 intervening therebetween as shown in FIG. 6, a slight radial gap G can be formed therebetween. As shown in FIGS. 5D and 5E in a fragmentary longitudinal sectional view and a plan view, respectively, each of the recessed seats 36 in the outer mount surface area 32 of the rotary nut 14 is formed with an axially extending insert groove 39 having its opposite ends opening into the respective recessed seat 36 and opening at the annular end face of the rotary nut 14, respectively, for insertion of the associated ball 38. As best shown in FIG. 5D, each insert groove 39 has its bottom inclined downwardly or inwardly towards the annular end face of the rotary nut 14. Other structural features than those described above are similar to those in the previously described embodiments and, therefore, the details thereof are not reiterated.

In this embodiment shown in FIGS. 5 and 6, since the motor rotor 10 can be coupled with the rotary nut 14 through the balls 38 movably received in part within the recessed seats 36 and in part within the recessed seats 37, alignment between the motor rotor 10 and the rotary nut 14 can be adjusted by the balls 38 so that any possible misalignment therebetween, which would otherwise occur when the both are fixed relative to each other, can be compensated for. The rotational torque of the motor rotor 10 can be assuredly transmitted to the rotary nut 14 without being accompanied by any rattling motion. Accommodation of the balls 38 into the recessed seats 36 and 37 and, hence, in between the rotary nut 14 and the motor rotor 10 can be easily accomplished by guiding the balls 38 through the insert grooves 39, defined in the rotary nut 14, when the motor rotor 10 is externally mounted onto the rotary nut 14.

Figure 7A:
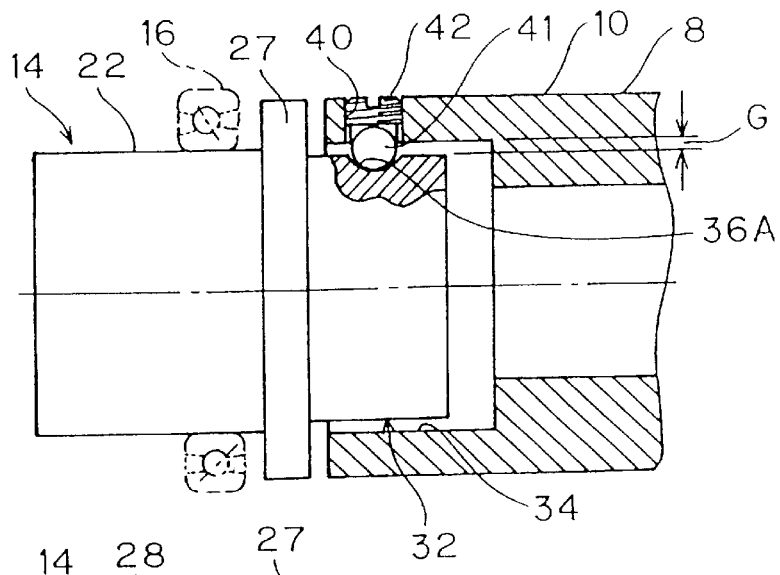
FIG. 7A is a longitudinal side view, with a portion shown in section, of the assembly of the rotary nut and the motor rotor forming respective parts of the ball screw mechanism according to a fourth preferred embodiment of the present invention.
Figure 7B:
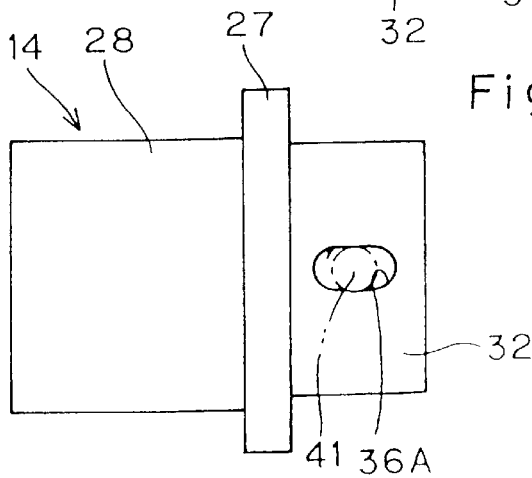
FIG. 7B is a longitudinal side view of the rotary nut employed in the ball screw mechanism according to the fourth embodiment of the present invention.

Referring to FIGS. 7A and 7B, there is shown a fourth preferred embodiment of the present invention. In this embodiment, the rotary nut 14 is formed with at least three concave seats 36A defined in the outer mount surface area 32 thereof at respective locations spaced an equal distance in a direction circumferentially thereof. On the other hand, the motor rotor 10 is also formed with a corresponding number of radial throughholes 40 extending completely across the wall of the motor rotor 10 and positioned at respective locations alignable with the concave seats 36A in the rotary nut 14. An engagement member 41 of a shape as will be described later are accommodated within the corresponding radial throughhole 40 and is confined therein by a respective plug member 42 which may be a externally threaded plug adapted to be threaded into the associated throughhole 40.

The engagement member 41, although shown as employed in the form of a ball, may be any member, for example, a peg, of a shape having a portion thereof representing a convex or semispherical surface complemental to the shape of the corresponding concave seat 36A so that when the rotary nut 14 and the motor rotor 10 are coupled together as best shown in FIG. 7A, the convex or semispherical surface of the engagement member 41 can be seated within the corresponding concave seat 36A. Each of the concave seats 36A defined in the outer mount surface area 32 of the rotary nut 14 may be a radially inwardly recessed seat similar to that shown in FIGS. 5A and 5B, but preferably has its opening representing an oval shape having a long axis extending parallel to the longitudinal axis of the rotary nut 14, or representing an elliptical shape depicted by connecting two semicircles through parallel straight lines as best shown in FIG. 7B with its long axis extending parallel to the longitudinal axis of the rotary nut 14. Other structural features than those described above are similar to those in the previously described embodiments and, therefore, the details thereof are not reiterated.

In this embodiment shown in FIGS. 7A and 7B, since the motor rotor 10 can be coupled with the rotary nut 14 through the engagement members 41 having their convex surfaces seated within the concave seats 36A, alignment between the motor rotor 10 and the rotary nut 14 can be adjusted by the engagement members 41 so that any possible misalignment therebetween, which would otherwise occur when the both are fixed relative to each other, can be compensated for. Accommodation of the engagement members 41 into the throughholes 40 can be easily accomplished by inserting the engagement members 41 into the respective throughholes 40, after the motor rotor 10 has been mounted onto the rotary nut 14 with the recesses seats 36A aligned with the throughholes 40, and then by fastening the externally threaded plugs 42 into the respective throughholes 40. The position of each externally threaded plug 42 within the corresponding throughhole 40 is so adjustable that the gripping force acting from the motor rotor 10 to the rotary nut 14 by way of the engagement members 41 when the externally threaded plugs 42 have been fastened can be adjusted.

Also, where the opening of each of the concave seats 36A is so shaped as to represent an oval or elliptical configuration with its long axis extending parallel to the longitudinal axis of the rotary nut 14, an axial displacement of the motor rotor 10 relative to the rotary nut 14 in an axial direction is permitted while the rotational torque of the motor rotor 10 can be assuredly transmitted to the rotary nut 14 without being accompanied by any rattling motion. Both the aligning capability and the elimination of the rattling in the direction of rotation can be attained simultaneously in a manner similar to that afforded where the recesses in the outer mount surface area of the rotary nut 14 are represented by the radially inwardly and semispherically recessed seats.

It is, however, to be noted that instead of each of the concave seats 36A represented by an oval or elliptical shape, each of the throughholes 40 may have an oval or elliptical cross sectional shape.

Figure 8A:
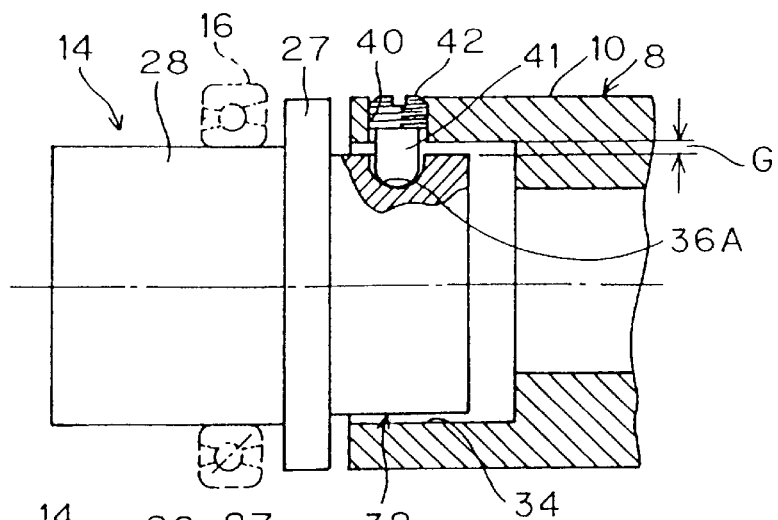
FIG. 8A is a longitudinal side view, with a portion shown in section, of the assembly of the rotor nut and the motor rotor forming respective parts of a modified form of the ball screw mechanism according to the fourth embodiment of the present invention.
Figure 8B:
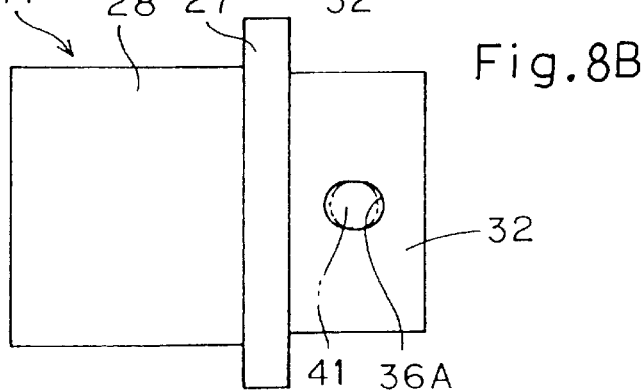
FIG. 8B is a longitudinal side view of the rotor nut employed in the modified form of the ball screw mechanism shown in FIG. 8A.

FIG. 8 illustrates a modification of the fourth embodiment shown in and described with reference to FIGS. 7A and 7B, wherein each of the engagement members 41 is employed in the form of a needle having one end outwardly rounded for engagement in the associated concave seat 36A. Other structural features than those described above are similar to those in the previously described embodiments and, therefore, the details thereof are not reiterated.

Figure 9:
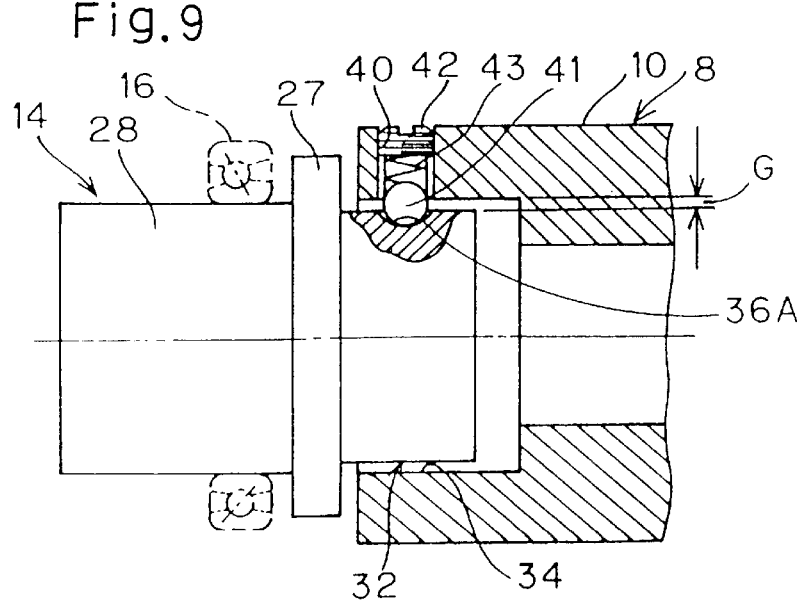
FIG. 9 is a longitudinal side view, with a portion shown in section, of the assembly of the rotary nut and the motor rotor forming respective parts of the ball screw mechanism according to a fifth preferred embodiment of the present invention.

A fifth preferred embodiment of the present invention is shown in FIG. 9. In this embodiment, an elastic member 43 is disposed within each of the throughholes 40 and interposed between the respective engagement member 41 and the corresponding plug 42, both employed in the embodiment shown in and described with reference to FIGS. 7A and 7B. Other structural features than those described above are similar to those in the previously described embodiments and, therefore, the details thereof are not reiterated.

According to the embodiment shown in FIG. 9, since the engagement members 41 are resiliently urged towards the associated concave seats 36A in the rotary nut 14, the gripping force acting from the motor rotor 10 to the rotary nut 14 by way of the engagement members 41 when the externally threaded plugs 42 have been fastened can be rendered to be uniform. Also, while adjusting the resilient force exerted by each elastic member 43, the gripping force referred to above can easily be adjusted.

Figure 10:
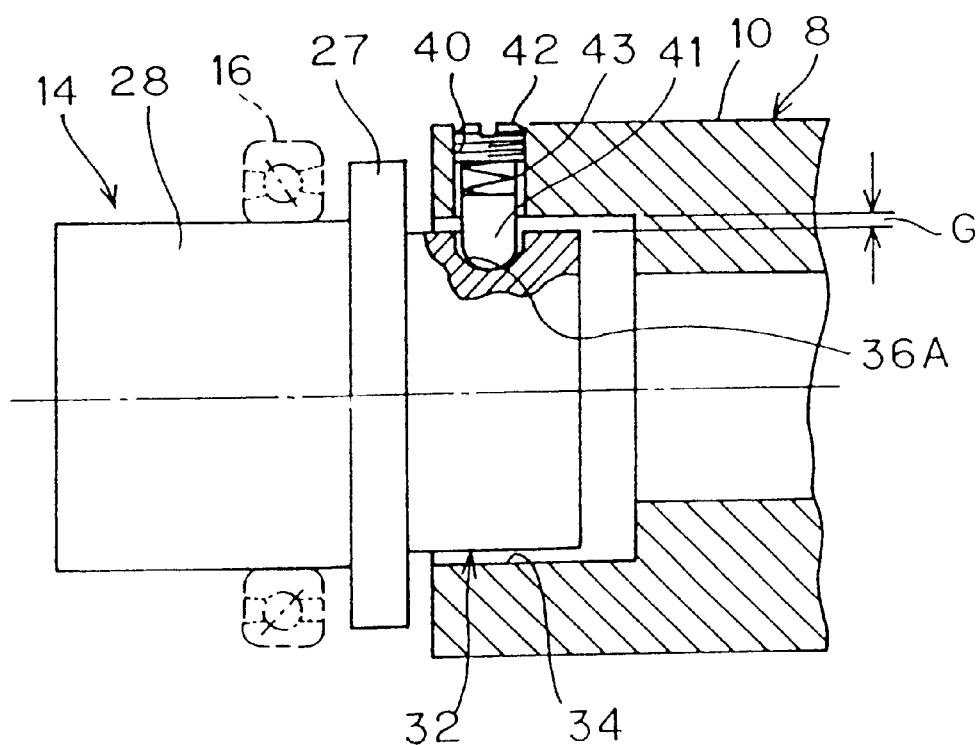
FIG. 10 is a longitudinal side view, with a portion shown in section, of the assembly of the rotary nut and the motor rotor forming respective parts of a modified form of the ball screw mechanism according to the fifth embodiment of the present invention.

FIG. 10 illustrates a modification of the embodiment shown in and described with reference to FIG. 9, wherein each of the engagement members 41 is employed in the form of a needle having one end outwardly rounded in a semispherical shape for engagement in the associated concave seat 36A. Other structural features than those described above are similar to those in the previously described embodiments and, therefore, the details thereof are not reiterated.

Figure 11A:
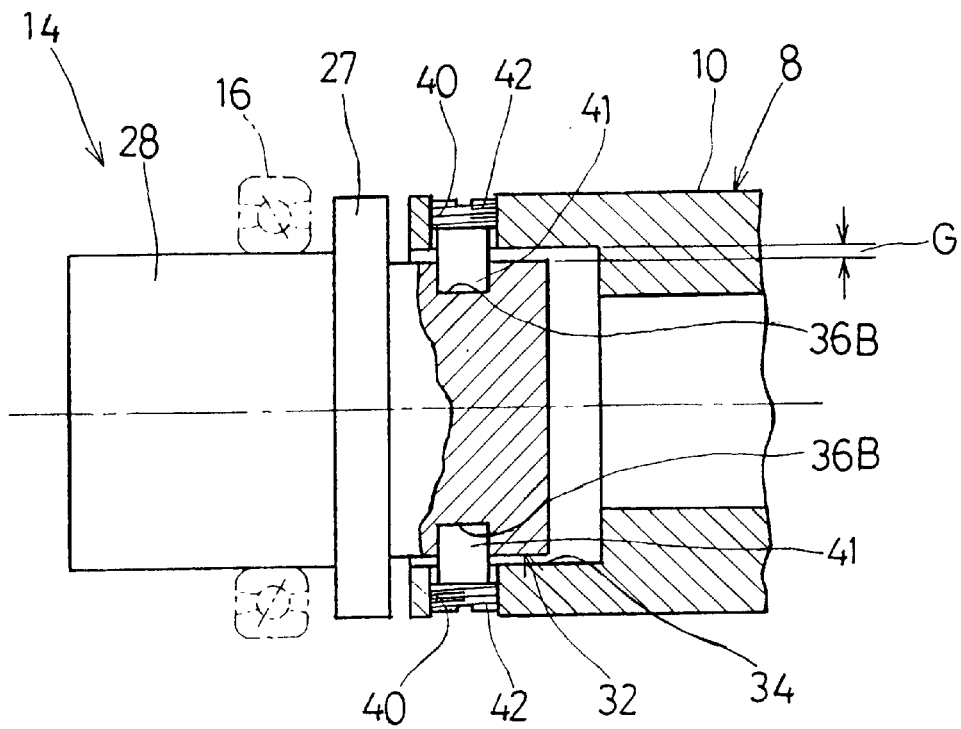
FIG. 11A is a longitudinal side view, with a portion shown in section, of the assembly of the rotor nut and the motor rotor forming respective parts of the ball screw mechanism according to a sixth preferred embodiment of the present invention.
Figure 11B:
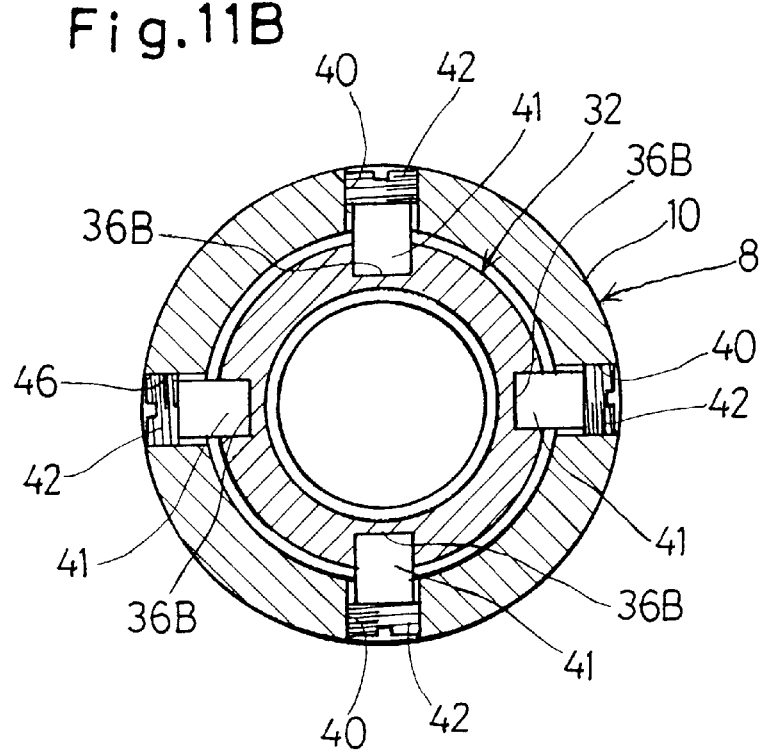
FIG. 11B is a transverse sectional view of the assembly of the rotary nut and the motor rotor forming respective parts of the ball screw mechanism shown in FIG. 11A.

Referring now to FIGS. 11A and 11B, there is shown a sixth preferred embodiment of the present invention shown in FIG. 8. In this embodiment, in place of the concave seats 36A used in the previously described embodiments, recesses 36B each having a cylindrical cross sectional shape and also having a flat bottom are defined in the outer mounting surface area 32 of the rotary nut 14. Also, the engagement members 41 that are employed in this embodiment are each in the form of a cylindrical member having one flat end adapted to be seated within the corresponding cylindrical recess 36B. Although the use of at least three cylindrical recesses 36B is sufficient for the purpose of the present invention, the four cylindrical recesses 36B are shown as spaced an equal distance from each other in a direction circumferentially of the rotary nut 14 as shown in FIG. 11B. With the engagement members 41 accommodated within the respective throughholes 40, externally threaded plugs 42 are fastened into the associated throughholes 40. Other structural features than those described above are similar to those in the previously described embodiments and, therefore, the details thereof are not reiterated.

According to the embodiment shown in FIGS. 11A and 11B, since the bottom of each of the cylindrical recesses 36B defined in the outer mount surface area 32 of the rotary nut 14 is flat in shape, there is no automatic aligning function such as exhibited in any one of the previously described embodiments. However, the presence of the radial gap G between the rotary nut 14 and the motor rotor 10 makes it possible to adjust the amount of each engagement member 41 pushed into the associated cylindrical recess 36B to thereby fix the rotary nut 14 and the motor rotor 10 together during the assemblage in which the rotary nut 14 and the motor rotor 10 are coupled together, without misalignment occurring between the rotary nut 14 and the motor rotor 10. During the assemblage, a rocking motion of the motor rotor 10 with respect to the position of the bearing 12 (See FIG. 1) for the support of the motor rotor 10 and a rocking motion of the rotary nut 14 with respect to the position of the bearing 12 for the support of the rotary nut 14 have to be measured to determine the amount of each engagement member 41 pushed into the associated cylindrical recess 36B, with which these rocking motions can be minimized, followed by fixing the respective engagement member 41 in position within the associated cylindrical recess 36B. Adjustment of the amount of each engagement member 41 pushed into the associated cylindrical recess 36B and fixing in position thereof are performed by fastening of the externally threaded plugs 42 into the respective throughholes 40.

Also where the bottom of each of the cylindrical recesses 36B is made flat and the engagement members 41 are employed to fix the rotary nut 14 and the motor rotor 10, unlike the situation in which inclination is automatically aligned, the possibility of the rotary nut 14 being inclined relative to the motor rotor 10 can be eliminated.

A seventh preferred embodiment of the present invention shown in FIGS. 12A and 12B may be considered a modification of the sixth embodiment shown in and described with reference to FIGS. 11A and 11B. According to the seventh embodiment, an elastic member 43 is disposed within each of the throughholes 40 and interposed between the respective engagement member 41 and the corresponding plug 42. Other structural features than those described above are similar to those shown in FIGS. 11A and 11B and, therefore, the details thereof are not reiterated.

Figure 12A:
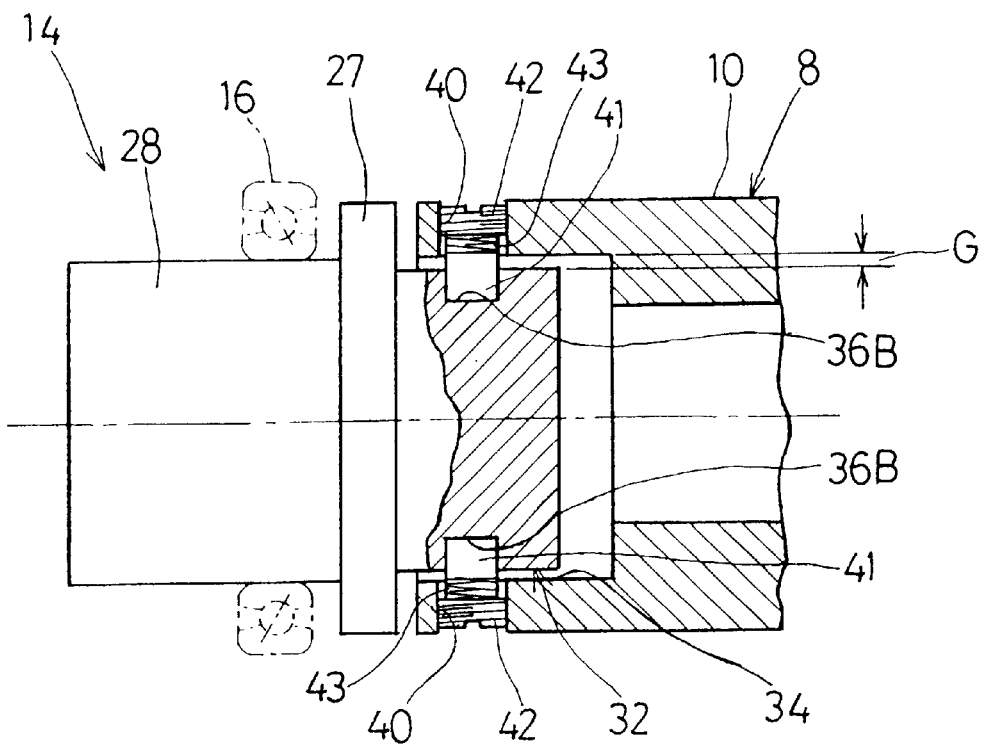
FIG. 12A is a longitudinal side view, with a portion shown in section, of the assembly of the rotor nut and the motor rotor forming respective parts of the ball screw mechanism according to a seventh preferred embodiment of the present invention.
Figure 12B:
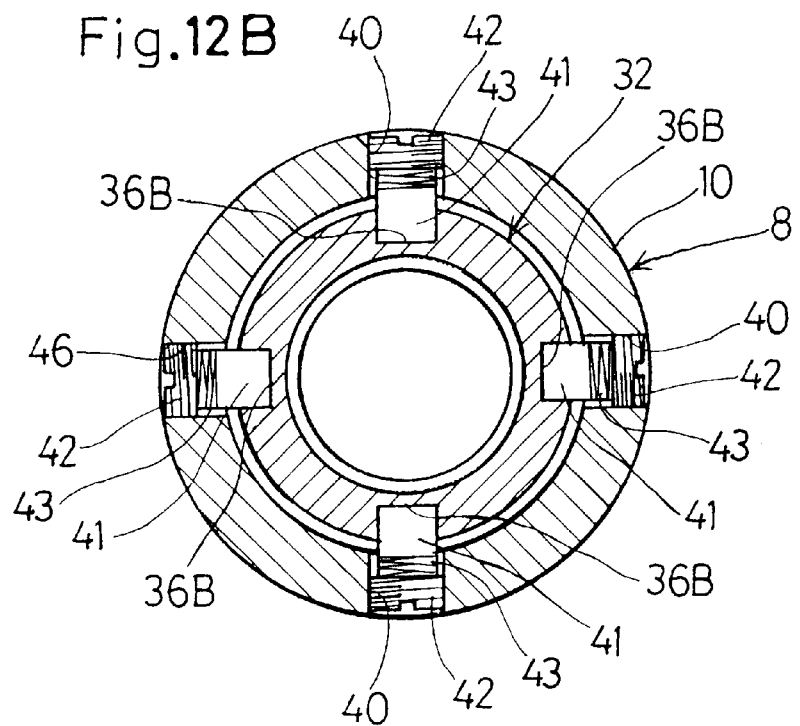
FIG. 12B is a transverse sectional view of the assembly of the rotary nut and the motor rotor forming respective parts of the ball screw mechanism shown in FIG. 12A.

According to the embodiment shown in FIGS. 12A and 12B, since the engagement members 41 are resiliently urged towards the associated flat-bottomed recess 36B in the rotary nut 14, the gripping force acting from the motor rotor 10 to the rotary nut 14 by way of the engagement members 41 when the externally threaded plugs 42 have been fastened can be rendered to be uniform. Also, while adjusting the resilient force exerted by each elastic member 43, the gripping force referred to above can easily be adjusted.

Figure 13A:
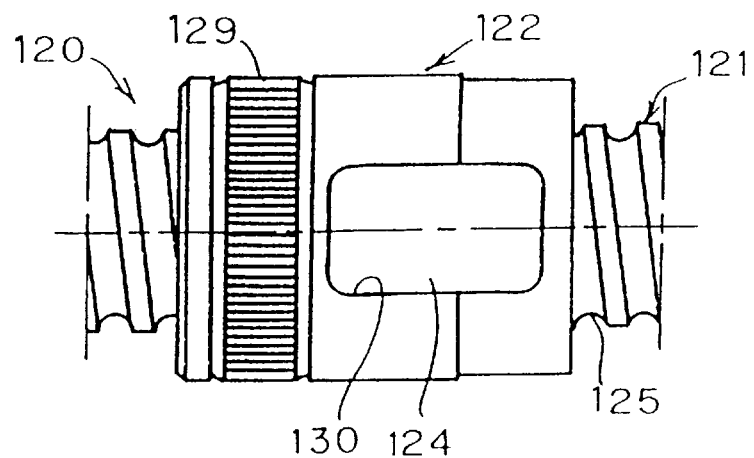
FIG. 13A is a longitudinal side view of the ball screw mechanism according to an eighth preferred embodiment of the present invention.
Figure 13B:
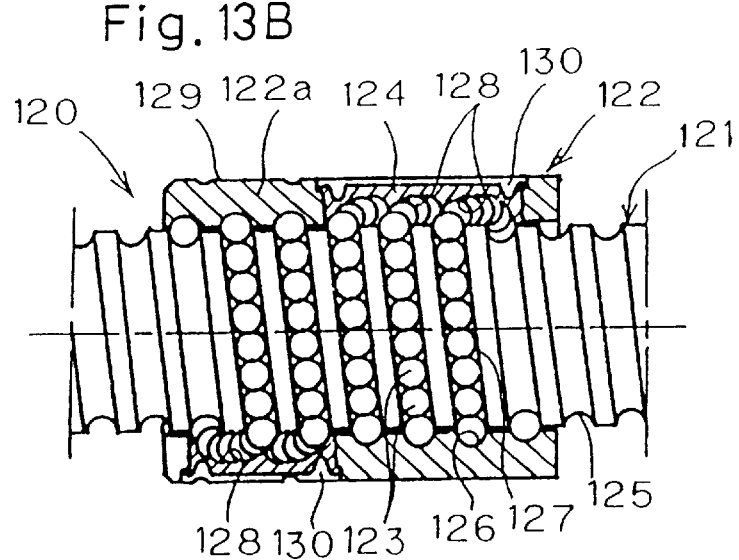
FIG. 13B is a longitudinal sectional view of the ball screw mechanism shown in FIG. 13A.
Figure 13C:
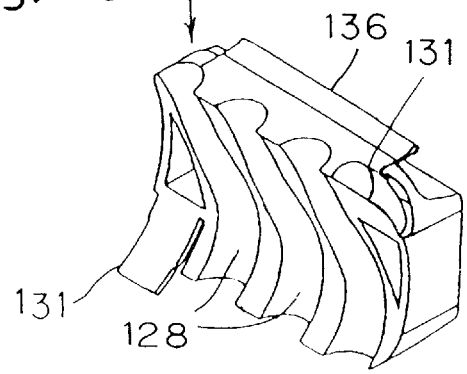
FIG. 13C is a perspective view of a bridge member employed in the ball screw mechanism shown in FIG. 13A.
Figure 14:
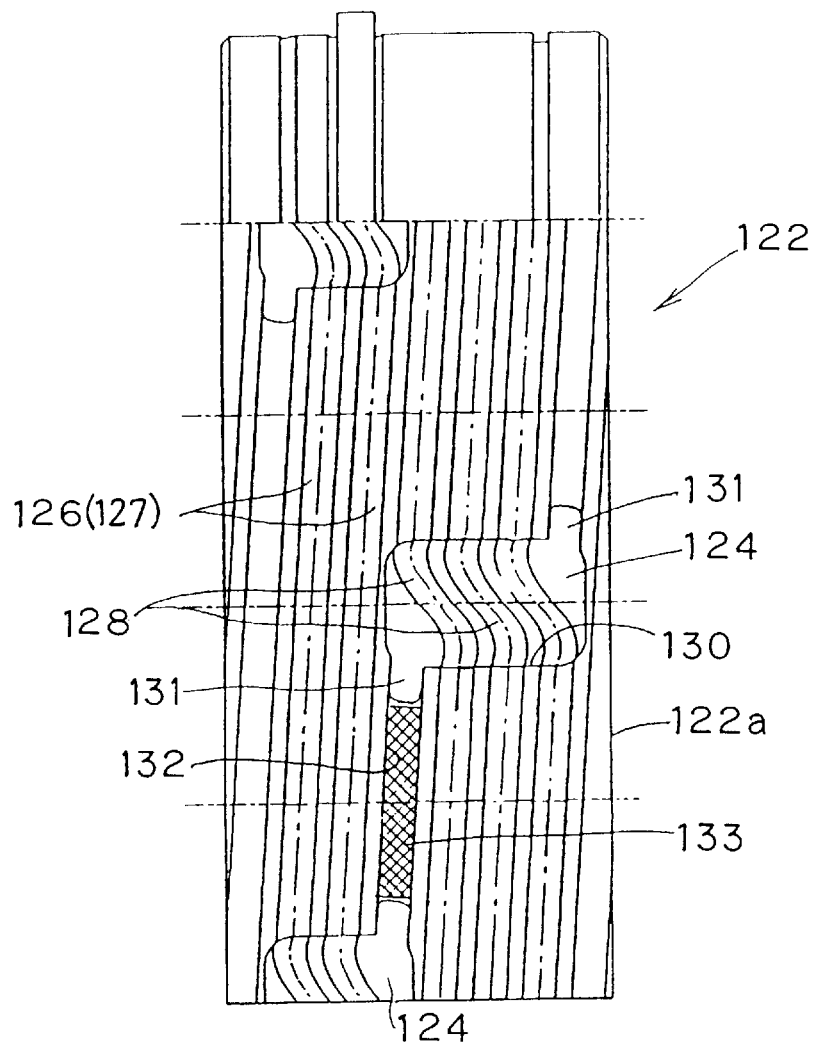
FIG. 14 is a developed representation showing an inner peripheral surface of the rotary nut employed in the ball screw mechanism shown in FIG. 13A.
Figure 15:
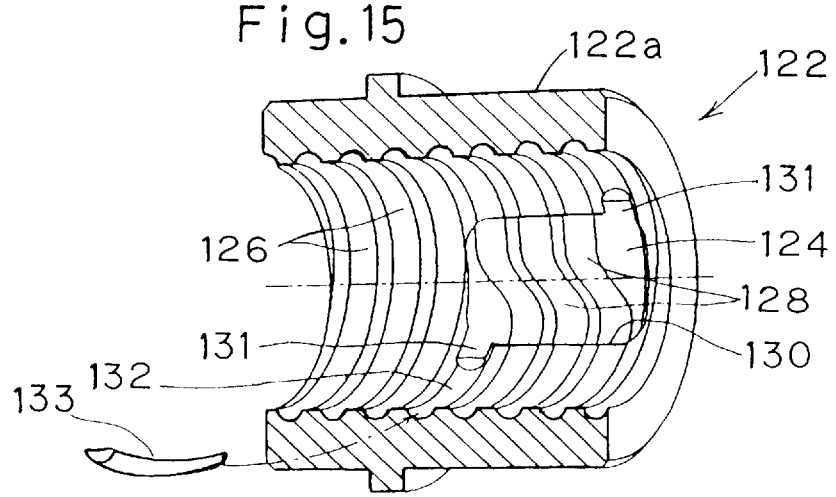
FIG. 15 is a fragmentary perspective view of one of longitudinal halves of the rotary nut employed in the ball screw mechanism shown in FIG. 13A.

With reference to FIGS. 13 to 15, an eighth preferred embodiment of the present invention will now be described. In this embodiment, unlike any one of the previously described embodiments, the electrically powered steering device of the structure shown in FIG. 1 employs a ball screw mechanism of a bridge type.

As best shown in FIGS. 13A to 13C, the bridge type ball screw mechanism 120 includes a ball screw shaft 121, a rotary nut 122 having a cylindrical nut body 122a, a series of balls 123 and a bridge member 124 secured to the nut body 122a to thereby complete the rotary nut 122. The ball screw shaft 121 has its periphery formed with an externally threaded helical groove 125. The rotary nut 122 is of a structure wherein the cylindrical nut body 122a has its inner peripheral surface formed with an internally threaded helical groove 126 defined therein in alignment with the externally threaded helical groove 125 in the ball screw shaft 121. The internally threaded helical groove 126 and the externally threaded helical groove 125 cooperate with each other to define a ball rolling guideway 127 with the series of the balls 123 snugly and neatly accommodated within such ball rolling guideway 127. Unlike any one of the previously described embodiments of the present invention, the rotary nut 122 has a portion of the outer peripheral surface formed with a surface roughened area 129 formed over the circumference thereof by the use of any known knurling technique and adapted for use in coupling with a motor rotor or the like.

The bridge member 124 is formed with a plurality of connecting groove segment 128 each communicating the neighboring convolutions of the internally threaded helical groove 126. Each of the connecting groove segments 128 is so designed and so configured as to connect the neighboring convolutions of the internally threaded helical groove 126 and, in the illustrated embodiment, the neighboring convolutions of the internally threaded helical groove 126 on the rotary nut 122 are communicated with each other by way of the corresponding connecting groove segment 128 to thereby complete one convolution of the ball rolling guideway 127. Thus, with the convolutions of the internally threaded helical groove 126 on the rotary nut 122 connected by way of the connecting groove segments 128, circumferentially extending circulating passages (circulating portions) each extending 360° about the longitudinal axis thereof are defined. Accordingly, some of the convolutions of the internally threaded helical groove 126, which are encompassed by the axial length of the bridge member 124, are depleted so that such depleted regions can be filled up by the connecting groove segments 128 to thereby complete the circumferentially extending circulating passages. Each of the connecting groove segments 128 has a depth sufficient to allow the balls 123 to ride over some of thread crests defining the externally threaded helical groove 125 on the ball screw shaft 121 within the connecting passage segments 128.

The bridge member 124 is secured to the nut body 122a at two locations spaced apart from each other in a direction axially of the rotary nut 122. The bridge members 124 at these two locations are spaced 180° in a direction circumferentially of the rotary nut 122. The number of the connecting groove segments 128 defined in one of the bridge members 124 may differ from that in the other of the bridge members 124. In the illustrated embodiment, one of the bridge members 124 has three connecting groove segments 128 whereas the other of the bridge members 124 has two connecting groove segments 128 as best shown in FIG. 13B. It is to be noted that the number of the bridge members 124 mounted on one rotary nut 122 may not be limited to two such as shown, but may be three or more.

FIG. 14 illustrates a developed representation of the inner peripheral surface of the rotary nut 122, and FIG. 15 illustrates a fragmentary perspective view of one of longitudinally split halves of the rotary nut 122. The nut body 122a of the rotary nut 122 is formed with a bridge receiving pocket 130 defined therein so as to extend completely across the thickness of the wall defining the nut body 122a, and the corresponding bridge member 124 is received within the receiving pocket 130 from inside of the nut body 122a.

Each of the bridge members 124 has a pair of arms 131 and 131 engageable in respective convolutions of the internally threaded helical grooves 126 on the rotary nut 122 for positioning the respective bridge member 124 relative to the nut body 122a of the rotary nut 122 in a direction axially thereof. These arms 131 and 131 in each bridge member 124 protrude outwardly from axially opposite ends of the respective bridge member 124 in respective directions counter to each other with respect to the circumferential direction of the internally threaded helical groove 126. Each of those arms 131 and 131 represents a generally semicircular sectional shape so that it can fit in with the associated convolution of the internally threaded helical groove 126. It is to be noted that each convolution of any one of the internally and externally threaded helical grooves 125 and 126 has a sectional shape similar to the shape of a Gothic arch.

As best shown in FIG. 13C, each of the bridge members 124 has its opposite side edges lying in a circumferential direction of the rotary nut 124, each of said side edges being formed with a guide wall 136 that protrudes radially outwardly from a corresponding side face of the respective bridge member 124 facing in the circumferential direction of the rotary nut 122. The guide wall 136 at each of the opposite side edges of the bridge member 124 is adapted to resiliently engage with one of opposite inner side faces of the bridge receiving opening 130 defined in the nut body 122a. As hereinbefore described, each of the bridge member 124 is engaged in the respective bridge receiving opening 130 from inside of the nut body 122a, at which time the arms 131 and 131 are engaged in the associated convolutions of the internally threaded helical groove 126 while the guide walls 136 has its free ridges engaged with opposite side edges of the associated bridge receiving opening 130. In this way, each bridge member 124 is fixed to the nut body 122a.

Each of the bridge members 124 may be made of a sintered alloy. Where each bridge member 124 is made of the sintered alloy, it may be manufactured in any known manner, but may be manufactured by the use of the following metal injection molding technique. Where each bridge member 124 is to be manufactured by the metal injection molding technique, a metal powder is first conditioned to assume a plastic form, followed by injection molding to provide the respective bridge member 124. Prior to the injection molding, a powder of metal is kneaded together with a binder comprising a plastic material and a wax to provide a kneaded product which is in turn palletized to produce pellets. A mass of the pellets is then supplied into a hopper of an injection molding machine and is, while heated to melt, poured into a mold assembly. The powder of metal referred to above is preferably of a kind capable of being carburized at a later process and may be of a composition containing, for example, 0.3% of carbon (C), 1 to 2% of nickel (Ni) and the balance being iron (Fe).

The nut body 122a of the rotary nut 122 may also be made of a sintered alloy similar to the bridge members 124.

Of the ball rolling guideway 127 formed between the internally and externally threaded helical grooves 125 and 126, respective portions of the circumferentially extending circulating passages (circulating portions) where the bridge members 124 are neighbored in the circumferential direction (i.e., a region of the convolution of the ball rolling guideway 127 that is delimited between one of the arms 131 of one of the bridge members 124 and one of the arms 131 of the other of the bridge members 124 that is aligned with such one of the arms 131 of such one of the bridge members 124, as shown in the developed representation of the rotary nut 122 in FIG. 14) represents a non-circulating portion 132 where no balls 123 exist or move therethrough. That portion of the convolution of the internally threaded helical groove 126 that is occupied by the non-circulating portion 132 is clogged by a filler member 133 filled therein. This filler member 133 is made of an elastic material such as, for example, a synthetic resin, so as to have a semicircular cross sectional shape generally similar to that of the convolution of the internally threaded helical groove 126 and is elastically filled in that portion of the convolution of the internally threaded helical groove 126 where the non-circulating portion 132 is defined.

In place of the elastic material, the filler member 133 may be made of a material having a flexible property, that is, of a kind capable of being easily plasticized. Also, the filler member 133 may be straight under a natural condition or generally permanently curved to follow the curvature of each convolution of the internally threaded helical groove 126. Since the filler member 133 is made of the elastic material or a flexible material, it can be easily and snugly fitted into that portion of the convolution of the internally threaded helical groove 126 even though the filler member 133 is straight under a natural condition.

With the ball screw mechanism 120 of the structure described above, since of the ball rolling guideway 127, the non-circulating portion 132 delimited between the circumferentially neighboring bridge members 124 and where no ball 123 move is clogged by the filler member 133, there is no possibility that during assemblage and particularly when the balls 123 are to be successively inserted into the ball rolling guideway 127, some of the balls 123 may be inadvertently inserted into the non-circulating portion 132. Accordingly, the locking of the ball screw mechanism 120 which would result from inadvertent insertion of some of the balls 123 into the non-circulating portion 132 can be avoided assuredly. Also, since the filler member 133 is so shaped as to resemble the shape of the non-circulating portion 132 and is made of the elastic material separate from the nut body 122a and then filled into the non-circulating portion 132, positioning of the filler member 133 into the non-circulating portion 132 can easily be achieved.

Also, since each of the bridge members 124 is fitted into the bridge receiving opening 130, formed in the rotary nut 122, from inside of the rotary nut 122, the respective bridge member 124 can be simply fixed in the nut body 122a of the rotary nut 122 without requiring any stop member. Since each bridge member 124 has the plurality of the connecting groove segments 128, the internally threaded helical groove 126 can have a reduced pitch between the neighboring convolutions thereof and, therefore, the rotary nut 122 can have an increased length sufficient to allow the number of the balls 123 to increased to thereby increase the load capacity. In addition, since each of the bridge members 124 is made of the sintered alloy, it can easily be manufactured by the use of an injection molding and sintering, thereby eliminating the need to use a machining process such as milling or grinding, resulting in a better mass-productivity. Therefore, a less costly manufacture is possible.

Figure 16:
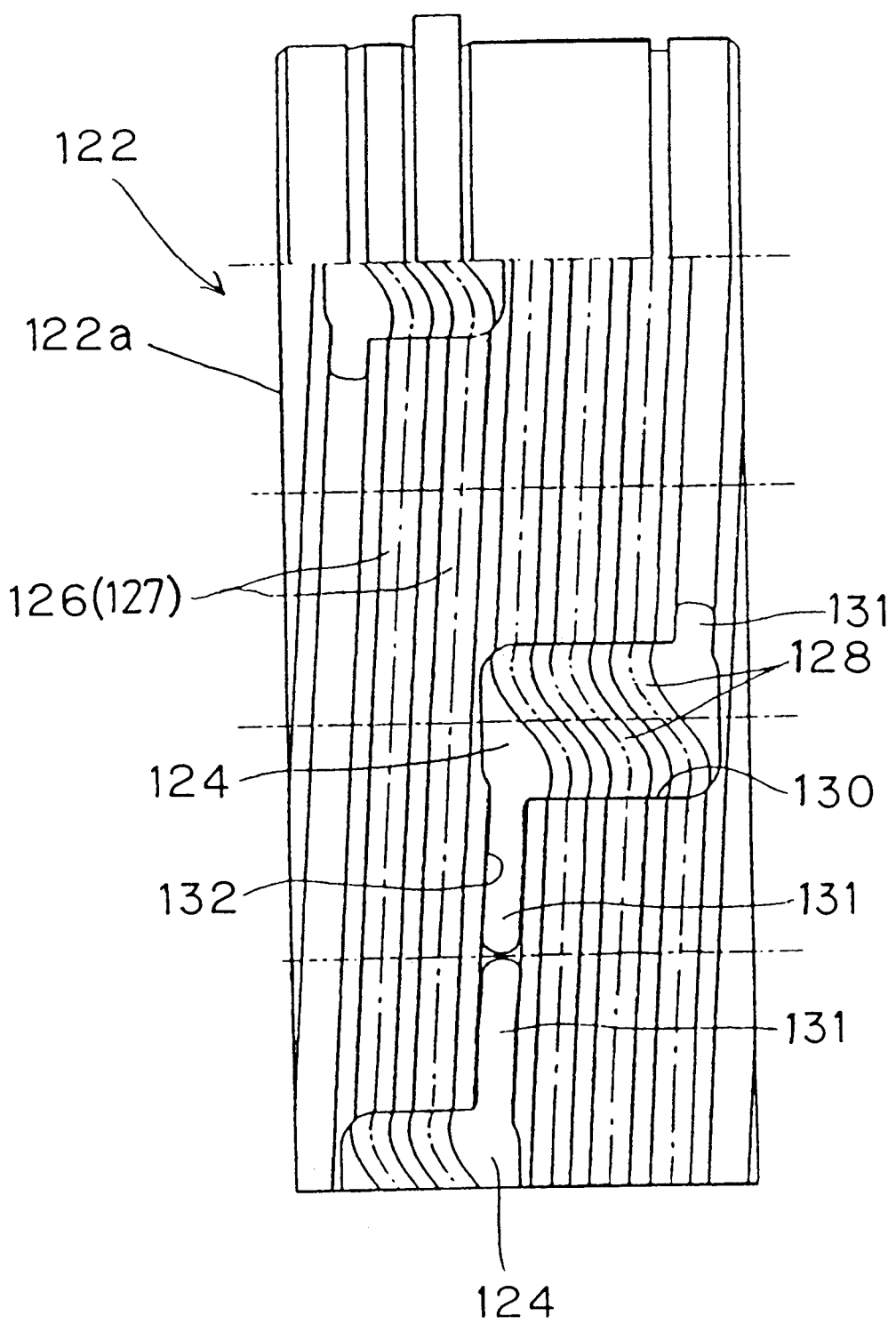
FIG. 16 is a developed representation showing the inner peripheral surface of the rotary nut employed in the ball screw mechanism according to a different preferred embodiment of the present invention.

FIG. 16 illustrates a developed view of the rotary nut employed in the ball screw mechanism according to another preferred embodiment of the present invention. The ball screw mechanism 120 in this embodiment may be considered a modification of the eighth embodiment shown in and described with reference to FIGS. 13 to 15, in which the respective positioning arms 131 of the neighboring bridge members 124 have a length longer than that in the eighth embodiment so that the respective positioning arms 131 can, when the bridge members 124 are held in position within the associated bridge receiving openings 130, have their free ends held in abutment with each other to fill up the non-circulating portion 132. Specifically, the positioning arm 131 of one of the bridge members 124 may have a length which, when the bridge members 124 are held in position within the associated bridge receiving opening 130, allow it to be held in abutment with, or to be spaced a distance smaller than the diameter of each ball 123, from the mating positioning arm 131 of the other of the bridge members 124.

Even with this structure, there is no possibility that during assemblage and particularly when the balls 123 are to be successively inserted into the ball rolling guideway 127, some of the balls 123 may be inadvertently inserted into the non-circulating portion 132. Accordingly, the locking of the ball screw mechanism 120 which would result from inadvertent insertion of some of the balls 123 into the non-circulating portion 132 can be avoided assuredly. Also, since the respective positioning arms 131 and 131 of each of the bridge members 124 concurrently serve as a filler member that fill up the non-circulating portion 132, the number of component parts used can be reduced and, accordingly, the number of steps required to completely assembly the ball screw mechanism 120 can also be reduced.

Figure 17A:
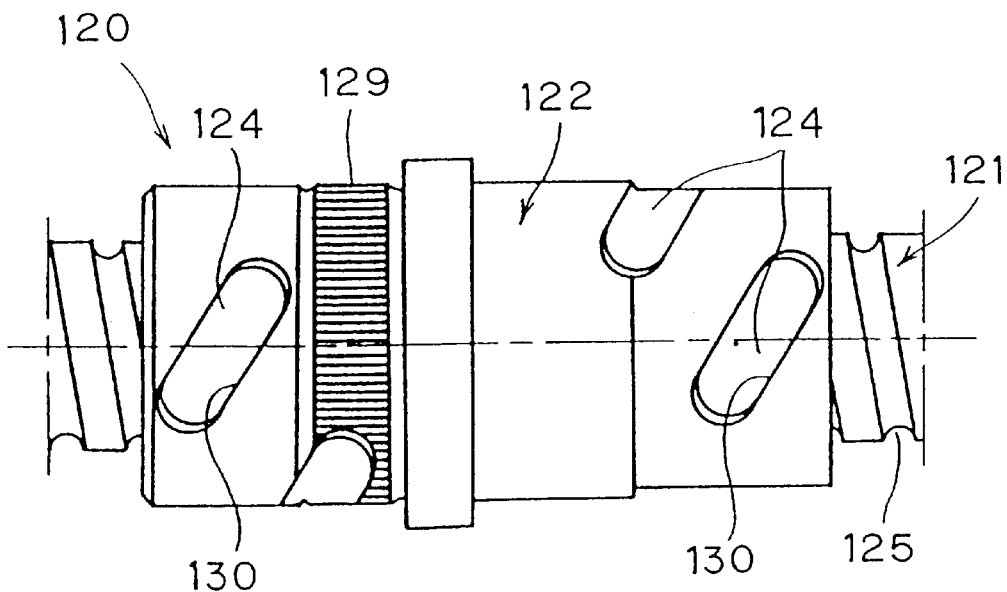
FIG. 17A is a longitudinal side view of the ball screw mechanism according to a further preferred embodiment of the present invention.
Figure 17B:
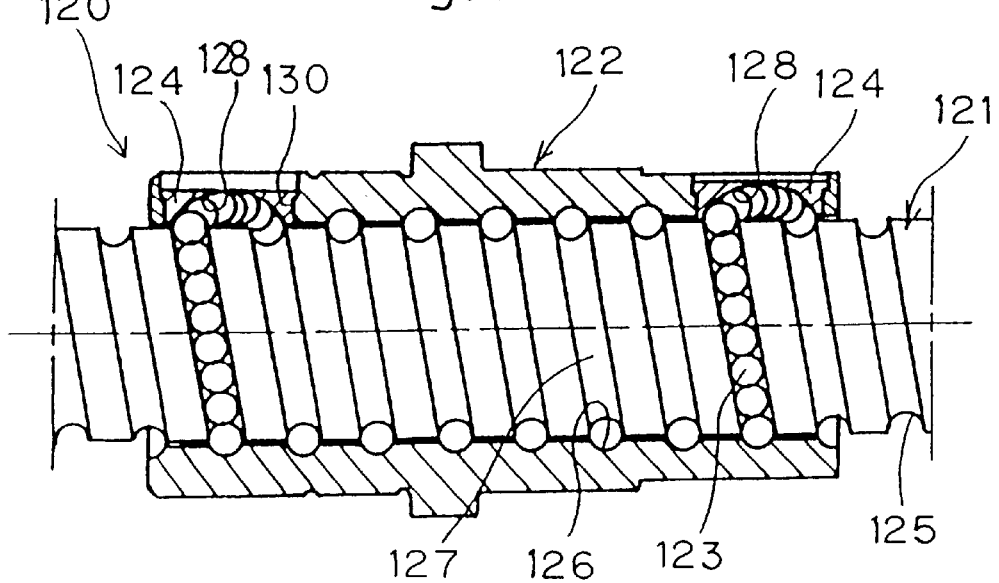
FIG. 17B is a longitudinal sectional view of the ball screw mechanism shown in FIG. 17A.
Figure 18:
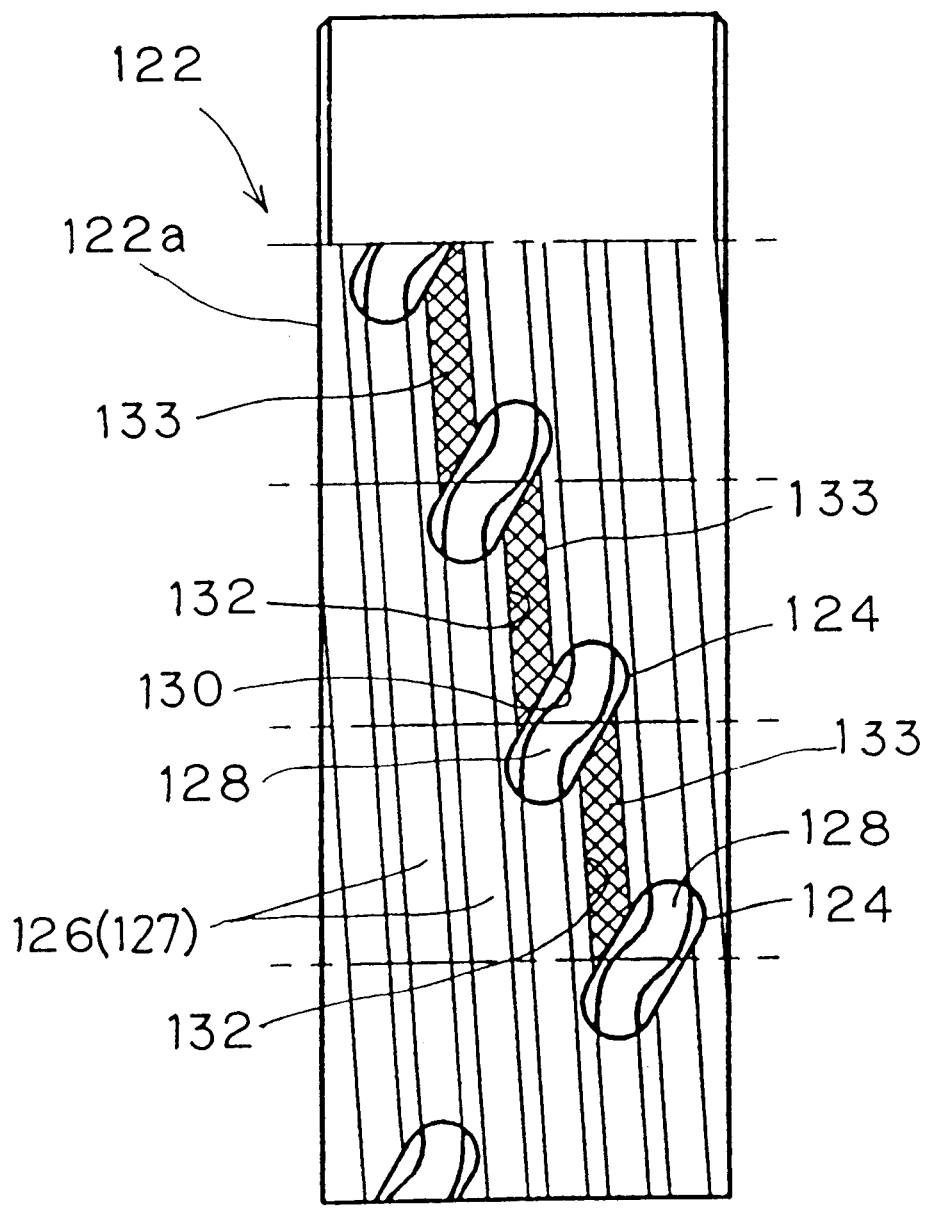
FIG. 18 is a developed representation showing the inner surface of the rotary nut employed in the ball screw mechanism shown in FIG. 17A.

FIGS. 17A to 18 illustrates the ball screw mechanism according to a further preferred embodiment of the present invention. This embodiment may be considered another modification of the eighth embodiment shown in and described with reference to FIGS. 13 to 15, in which each of the bridge member 124 has only one connecting groove segment 128 formed therein. Although each of the bridge member 124 has no positioning arm such as employed in the previously described eighth embodiment, each bridge member 124 as a whole represents an oval shape and is adapted to be fixed in the correspondingly oval shaped bridge receiving opening 130, defined in the rotary nut 122, after having been inserted therein from outside of the rotary nut 122.

The inner peripheral surface of the rotary nut 122 is shown in FIG. 18 in a developed view. As shown therein of the ball rolling guideway 127 defined by the externally and internally threaded helical grooves 125 and 126, a non-circulating portion 132 is defined in the convolution of the internally threaded helical groove 126 at a respective location between the circumferentially neighboring bridge members 124. Each of those non-circulating portions 132 has a filler member 133 resiliently engaged therein in a manner similar to that in the previously described eighth embodiment. Each filler member 133 is also made of an elastic material such as a synthetic resin or a flexible material. Other structural features of the ball screw mechanism 120 in this embodiment are similar to those in any one of the previously described embodiments and the details thereof are not therefore reiterated.

Even with this structure shown in FIGS. 17A to 18, there is no possibility that during assemblage and particularly when the balls 123 are to be successively inserted into the ball rolling guideway 127, some of the balls 123 may be inadvertently inserted into the non-circulating portions 132. Accordingly, the locking of the ball screw mechanism 120 which would result from inadvertent insertion of some of the balls 123 into the non-circulating portion 132 can be avoided assuredly.

Figure 19:
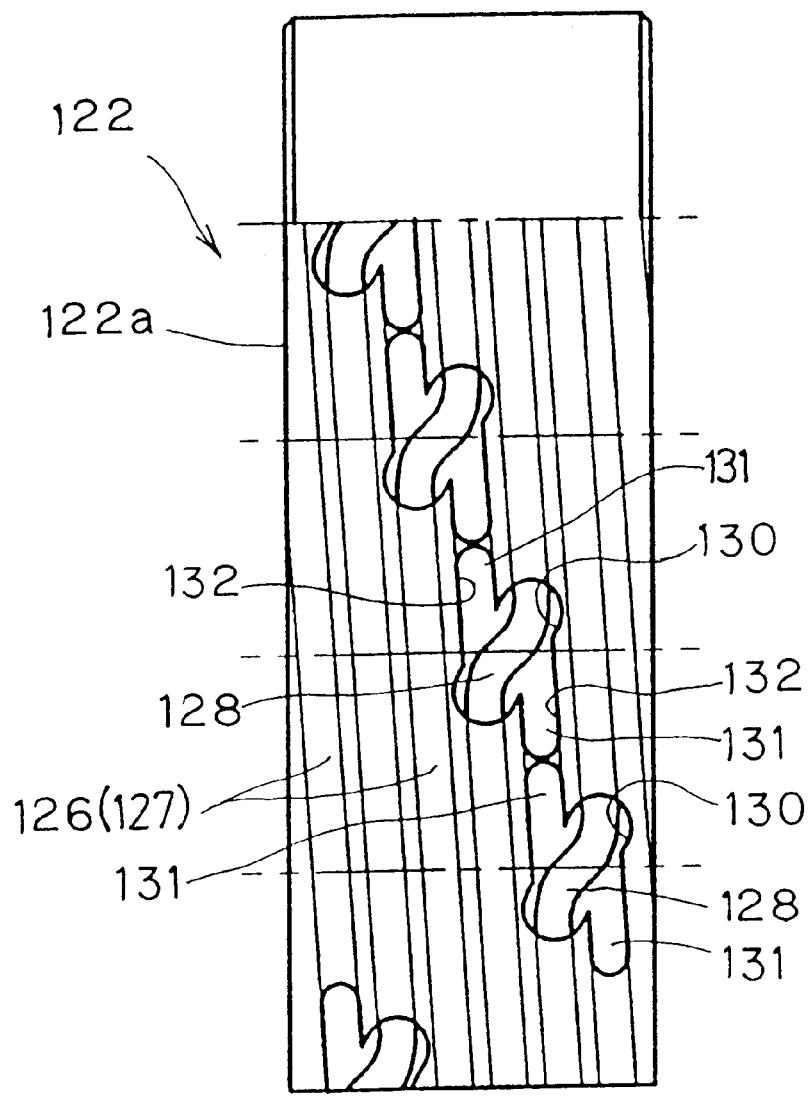
FIG. 19 is a developed representation showing the inner surface of the rotary nut employed in the ball screw mechanism according to a still further preferred embodiment of the present invention.
Figure 20A:
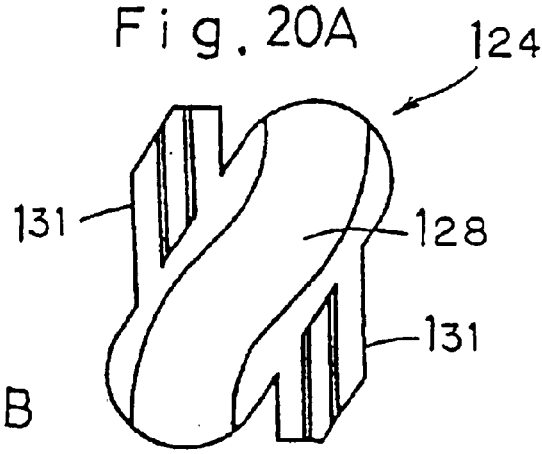
FIGS. 20A to 20C are rear, side and front elevational views, respectively, of the bridge member used in the ball screw mechanism shown in FIG. 19.
Figure 20B:
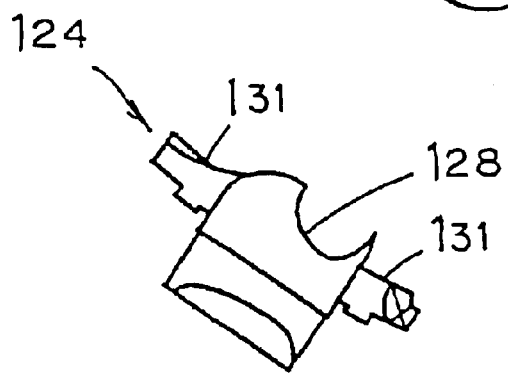
Figure 20C:
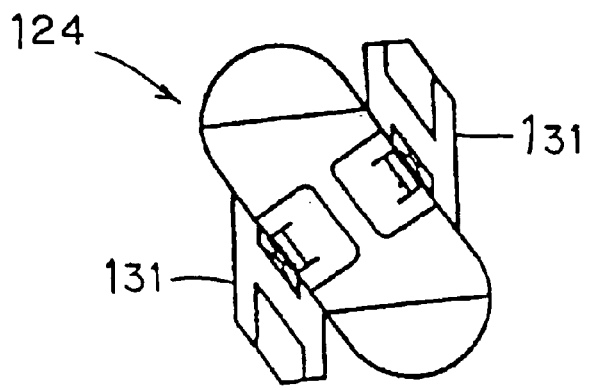
Figure 20D:
FIG. 20D is an end view of an arm of the bridge member employed in the ball screw mechanism shown in FIG. 19.
Figure 21:
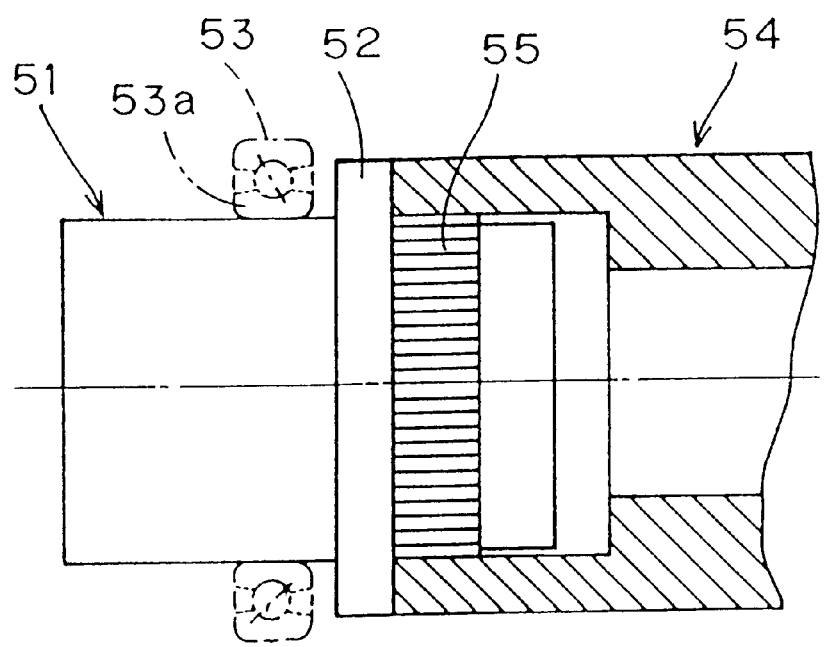
FIG. 21 is a longitudinal side view, with a portion shown in section, of the assembly of the rotor nut and the motor rotor forming respective parts of the prior art ball screw mechanism.
Figure 22:
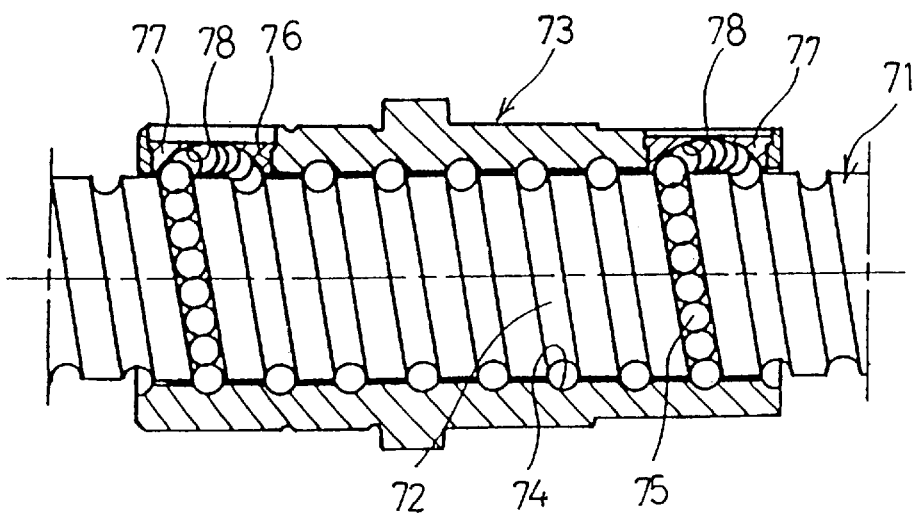
FIG. 22 is a longitudinal side view, with a portion shown in section, of the prior art ball screw mechanism employed in an electrically powered steering device.
Figure 23:
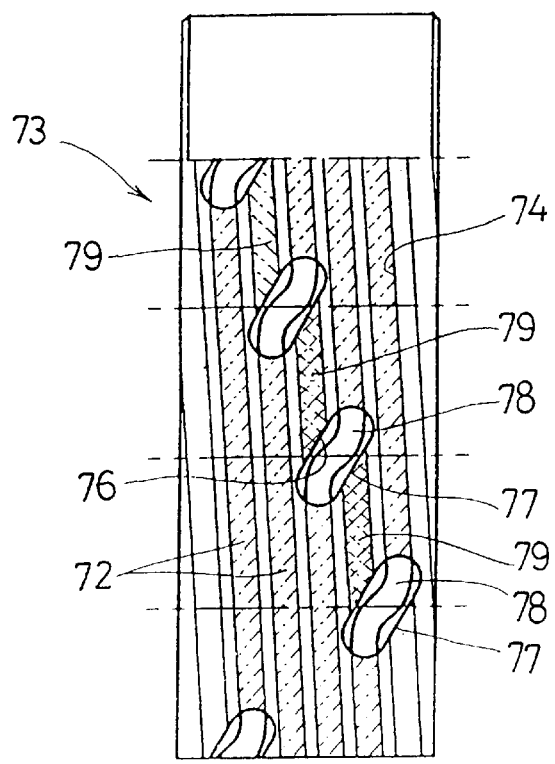
FIG. 23 is a developed representation showing the inner peripheral surface of the rotary nut employed in the prior art ball screw mechanism shown in FIG. 22.
Figure 24:
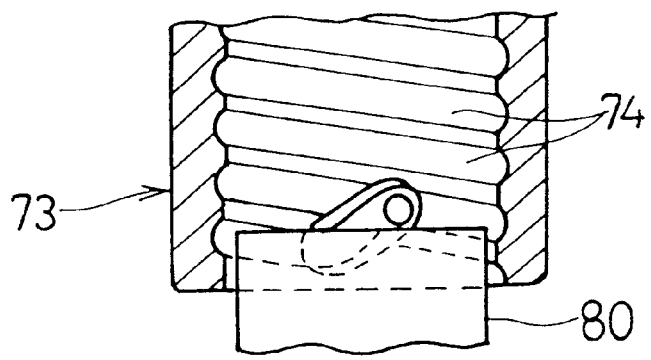
FIG. 24 is a fragmentary longitudinal sectional view of the prior art ball screw mechanism of FIG. 22, showing the manner of assemblage of the ball screw mechanism.

FIGS. 19 to 20C illustrate the ball screw mechanism according to a still further preferred embodiment of the present invention. In the ball screw mechanism of the design in which each of the bridge members 124 has only one connecting groove segment 128 formed therein as is the case in the embodiment shown in FIGS. 17A to 18, each of the bridge members 124 is formed with arms 131 that serve as a filler member for filling up the corresponding non-circulating portion 132. More specifically, as shown in FIG. 20, each bridge member 124 has a pair of arms 131 engageable in the internally threaded helical groove 126 in the rotary nut 122. Thus, of the ball rolling guideway 127, the non-circulating portion 132 defined in the corresponding convolution of the internally threaded helical groove 126 at a location between the circumferentially neighboring bridge members 124 are filled up by these arms 131 of those neighboring bridge members 124. As best shown in FIG. 19, the respective arms 131, when the bridge members 124 are held in position within the associated bridge receiving openings 130, have their free ends held in abutment with or in the vicinity of each other to fill up the corresponding non-circulating portion 132. Other structural features of the ball screw mechanism in this embodiment are similar to those in the eighth embodiment and the details thereof are not therefore reiterated. It is, however, to be noted that the arms 131 of each of the bridge members 124 may, or may not, have a function of positioning the respective bridge member 124 relative to the nut body 122a with respect to the direction axially thereof.

Even with this structure shown in FIGS. 19 to 20C, there is no possibility that during assemblage and particularly when the balls 123 are to be successively inserted into the ball rolling guideway 127, some of the balls 123 may be inadvertently inserted into the non-circulating portion 132. Accordingly, the locking of the ball screw mechanism 120 which would result from inadvertent insertion of some of the balls 123 into the non-circulating portion 132 can be avoided assuredly. Also, since the respective arms 131 and 131 of each of the bridge members 124 concurrently serve as a filler member that fill up the non-circulating portion 132, the number of component parts used can be reduced and, accordingly, the number of steps required to completely assembly the ball screw mechanism 120 can also be reduced.

In the electrically powered steering device of the structure shown in FIG. 1 and incorporating the ball screw mechanism 120 of the structure shown in and described with reference to FIGS. 19 to 20C, the ball screw mechanism 120 employed is the bridge type as described previously and the rotary nut 122 has the surface roughened area 129 defined on that portion of the outer peripheral surface thereof as shown in FIG. 13A, and the motor rotor 10 is mounted onto the rotary nut 122 with the inner peripheral surface of the motor rotor 10 engaged with the surface roughened area 129. Other structural features of the electrically powered steering device are similar to those shown in and described in connection with the first embodiment and the details thereof are not therefore reiterated.

In the electrically powered steering device shown in FIG. 1, since the ball screw mechanism 120 that is an important component of the device for transmission of the motor output is so structured and so configured as hereinabove described, an undesirable locking of the ball screw mechanism 120 can advantageously be increased a safety factor of the electrically powered steering device.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A ball screw mechanism for an electrically powered steering device, which comprises:
   a ball screw shaft;
   a rotary nut having an inner peripheral surface formed with an internally threaded helical groove cooperating with the ball screw shaft to define a ball rolling guideway between the ball screw shaft and the internally threaded helical groove;
   a series of balls disposed in the ball rolling guideway for transmitting a force between the rotary nut and the ball screw shaft; and
   a plurality of bridge members secured to the rotary nut, to thereby complete the rotary nut, each having a connecting groove segment defined therein for communicating neighboring convolutions of the internally threaded helical groove in the rotary nut;
   wherein the convolution of the internally threaded helical groove has a non-circulating portion delimited between the neighboring bridge members, wherein no ball of the series of balls moves in the non-circulating portion, and wherein a filler member is disposed in the non-circulating portion to fill up such non-circulating portion.

2. The ball screw mechanism as claimed in claim 1, wherein the filler member is so shaped as to represent a shape generally similar to the non-circulating portion and is made of a separate elastic member adapted to be resiliently disposed in the non-circulating portion between the neighboring bridge members.

3. The ball screw mechanism as claimed in claim 1, wherein each of the bridge member has positioning arms engageable in the convolution of the internally threaded helical groove in the rotary nut for positioning the respective bridge member relative to the rotary nut with respect to a direction axially thereof, said arms being disposed to fill up the non-circulating portion.

4. The ball screw mechanism as claimed in claim 1, wherein each of the bridge members is inserted into a bridge receiving opening, defined in the rotary nut, from inside of the rotary nut.

5. The ball screw mechanism as claimed in claim 1, wherein each of the bridge members has a plurality of connecting groove segments defined therein.

6. The ball screw mechanism as claimed in claim 1, wherein each of the bridge members is made of a sintered alloy.

7. The ball screw mechanism as claimed in claim 1, wherein each of the bridge member has positioning arms engageable in the convolution of the internally threaded helical groove in the rotary nut for positioning the respective bridge member relative to the rotary nut with respect to direction axially thereof.

8. A ball screw mechanism for an electrically powered steering device, which comprises:
   a ball screw shaft;
   a rotary nut having an inner peripheral surface formed with an internally threaded helical groove cooperating with the ball screw shaft to define a ball rolling guideway between the ball screw shaft and the internally threaded helical groove;
   a series of balls disposed in the ball rolling guideway for transmitting a force between the rotary nut and the ball screw shaft; and
   a plurality of bridge members secured to the rotary nut, to thereby complete the rotary nut, each having a connecting groove segment defined therein for communicating neighboring convolutions of the internally threaded helical groove in the rotary nut; wherein
   the convolution of the internally threaded helical groove has a non-circulating portion delimited between the neighboring bridge members,
   no balls of the series of balls moves in the non-circulating portion, and in that a filler member is disposed in the non-circulating portion to fill up such non-circulating portion, and
   each of the bridge members has a plurality of connecting groove segments defined therein.

9. The ball screw mechanism as claimed in claim 8, wherein the filler member is so shaped as to represent a shape generally similar to the non-circulating portion and is made of a separate elastic member adapted to be resiliently disposed in the non-circulating portion between the neighboring bridge members.

10. The ball screw mechanism as claimed in claim 8, wherein each of the bridge members is inserted into a bridge receiving opening, defined in the rotary nut, from inside of the rotary nut.

11. The ball screw mechanism as claimed in claim 8, wherein each of the bridge members is made of a sintered alloy.

12. The ball screw mechanism as claimed in claim 8, wherein each of the bridge member has positioning arms engageable in the convolution of the internally threaded helical groove in the rotary nut for positioning the respective bridge member relative to the rotary nut with respect to a direction axially thereof.

13. An electrically powered steering device which comprises: a housing, a steering shaft driving connected with a steering mechanism to steer wheels and extending through the housing a motion translating mechanism to translate a rotary motion of a steering wheel into a force necessary to move the steering shaft in a direction axially thereof, a ball screw mechanism including a rotary nut and a ball screw shaft defined by a portion of the steering shaft, and an electric drive motor having a motor rotor, said motor rotor having one end portion mounted on an end portion of the rotary nut, and the ball screw mechanism being of a bridge type as defined in claim 8.

14. The ball screw mechanism as claimed in claim 12, wherein said arms are disposed to fill up the non-circulating portion.

* * * * *